US012770849B2

(12) United States Patent
Stewart et al.

(10) Patent No.: US 12,770,849 B2
(45) Date of Patent: Oct. 20, 2026

(54) HYBRID MASS SPECTROMETER AND DATA ACQUISITION METHODS

(71) Applicant: Thermo Fisher Scientific (Bremen) GmbH, Bremen (DE)

(72) Inventors: Hamish Stewart, Bremen (DE); Christian Hock, Bremen (DE); Philipp Cochems, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 311 days.

(21) Appl. No.: 18/441,990

(22) Filed: Feb. 14, 2024

(65) Prior Publication Data

US 2025/0046593 A1 Feb. 6, 2025

(51) Int. Cl.

| | |
|---|---|
| ***H01J 49/00*** | (2006.01) |
| ***G01N 30/72*** | (2006.01) |
| ***G01N 30/86*** | (2006.01) |
| *G01N 30/02* | (2006.01) |

(52) U.S. Cl.

CPC ........ *H01J 49/004* (2013.01); *G01N 30/7233* (2013.01); *G01N 30/8637* (2013.01); *G01N 2030/027* (2013.01)

(58) Field of Classification Search

None

See application file for complete search history.

(56) References Cited

U.S. PATENT DOCUMENTS

| | | | |
|---|---|---|---|
| 7,170,052 | B2 | 1/2007 | Furutani et al. |
| 7,420,161 | B2 | 9/2008 | Kovtoun |
| 7,649,170 | B2 | 1/2010 | Wang et al. |
| 7,999,223 | B2 | 8/2011 | Makarov et al. |
| 8,198,580 | B2 | 6/2012 | Schwartz et al. |
| 9,136,101 | B2 | 9/2015 | Grinfeld et al. |
| 9,548,195 | B2 | 1/2017 | Hock et al. |
| 10,699,888 | B2 | 6/2020 | Giannakopulos et al. |

(Continued)

FOREIGN PATENT DOCUMENTS

| | | | |
|---|---|---|---|
| GB | 2491305 | A | 11/2012 |
| WO | 2012175517 | A2 | 12/2012 |

(Continued)

OTHER PUBLICATIONS

Combined Search and Examination Report under Sections 17 and 18(3) from GB 2302145.4, dated Aug. 9, 2023, 7 pages.

*Primary Examiner* — Suman K Nath

(74) *Attorney, Agent, or Firm* — Klarquist Sparkman, LLP

(57) ABSTRACT

A dual analyser mass spectrometer obtains MS1/MS2 scans of positive and negative ions by: operating an ion source and processing region at a first polarity; performing, by a first mass analyser (FMA) at the first polarity, MS1 or MS2 scan(s); switching polarity of the FMA to a second polarity; performing, by a second mass analyser (SMA) at the first polarity, MS1 or MS2 scan(s), wherein at least part of the MS1 or MS2 scan(s) performed by the SMA is performed while the FMA is switching polarity. Alternatively, the FMA may be operated at a first polarity and the SMA at a second polarity opposite to the first, and after initiating at least one MS1 scan and/or MS2 scan by the FMA, switching the polarity of the source and ion processing region to a second polarity and performing at least one MS1 scan and/or MS2 scan with the SMA.

33 Claims, 12 Drawing Sheets

(56) References Cited

U.S. PATENT DOCUMENTS

| | | | | |
|---|---|---|---|---|
| 2003/0001088 | A1 | 1/2003 | Bateman et al. | |
| 2009/0072132 | A1 | 3/2009 | Manri et al. | |
| 2012/0256083 | A1 | 10/2012 | Kovtoun | |
| 2013/0256524 | A1* | 10/2013 | Brown ................ | H01J 49/0031 250/281 |
| 2015/0028197 | A1 | 1/2015 | Grinfeld et al. | |
| 2015/0287585 | A1 | 10/2015 | Kovtoun et al. | |
| 2020/0328068 | A1* | 10/2020 | Giannakopulos ... | H01J 49/0027 |
| 2024/0203716 | A1* | 6/2024 | Chernyshev ........ | H01J 49/0009 |

FOREIGN PATENT DOCUMENTS

| | | | |
|---|---|---|---|
| WO | 2013076307 | A2 | 5/2013 |
| WO | 2013171313 | A1 | 11/2013 |

* cited by examiner

HYBRID MASS SPECTROMETER AND DATA ACQUISITION METHODS

CROSS REFERENCE TO RELATED APPLICATIONS

This application claims priority from application GB 2302145.4, filed Feb. 15, 2023. The entire disclosure of application GB 2302145.4 is incorporated herein by reference.

TECHNICAL FIELD

The present invention relates to methods of operating a dual analyser mass spectrometer to obtain MS1 and MS2 scans of ions from a sample, for example, as it elutes from a chromatography system. There are provided methods for obtaining scans for positive and negative polarity ions. There is also provided apparatus for performing the methods.

BACKGROUND

Mass spectrometry is a long established technique for identification and quantification of a wide range of biological and non-biological materials, often including complex mixtures of large organic molecules.

Proteins, comprising large numbers of amino acids, are typically of significant molecular weight. Thus accurate identification and quantification of the protein by direct mass spectrometric measurement is challenging. It is known to carry out fragmentation of the ionised sample material, which is considered a precursor ion. A variety of fragmentation techniques are known, which may result in the generation of different fragment ions from the precursor ions.

To determine the molecular structure of sample molecules, a mass spectrometer may first be used to mass analyse all sample ions (precursor ions) within a selected mass-to-charge ratio (m/z) range. Such a scan is often denoted as an MS1 scan. Secondly, the sample ions may be fragmented and mass analysed. In this second step, sample ions from a narrow window of the mass-to-charge range may be selected, fragmented and the resulting fragments mass analysed. The mass analyser itself may still scan a similar wide range of mass-to-charge ratio as for the MS1 scan because after fragmentation the ions may have a similarly wide mass-to-charge ratio range. A scan of fragmented ions is often denoted as an MS2 scan. Multiple MS2 scans are commonly performed because the narrow window of the m/z range selected for each MS2 may be smaller than that of the precursor ion scan. The multiple MS2 scans may be used to cover a desired range of sample ion m/z.

Two methods of specifying the range covered by the MS2 scans are data independent analysis or acquisition (DIA) and data dependent analysis or acquisition (DDA). Data independent analysis/acquisition (DIA) may be used to determine what is present in a sample of potentially unknown identity. With this method a mass spectrometer is first used to mass analyse all sample ions (precursor ions) within a selected mass-to-charge ratio (m/z) range to obtain an MS1 scan. For the MS2 scans, the mass range of interest is simply divided into segments and an MS2 spectrum is obtained for each segment. For DIA, the MS1 scan may be optional since the parameters for the selection window for determining which ions to select and on which to perform MS2 scans in itself carries information on the range of possible sample ions in the window. Data dependent analysis/acquisition (DDA) differs from DIA in that DDA is more suited to confirming the presence of one or more species in the sample or is used when there is substantial knowledge of the species in, and structure of, the sample. Hence, this knowledge of species and structure can be used to identify a fixed or limited number of expected precursor ions and to select and analyse those. The fragmentation and MS2 spectra may be performed based on an "inclusion list" of species that are candidates to be found. Additionally or alternatively, the fragmentation and MS2 spectra may be set based on species as determined by the MS1 scan, e.g. based on intensity ranking of abundance of species as determined by the MS1 scan.

The majority of mass spectrometric studies are performed via positive ion detection, however many analytes, such as acidic peptides and entire classes of lipids, are far more amenable to negative ionization and detection. It is common for commercial mass spectrometer instruments to be switchable between positive and negative ion modes, even down to the timescale of analyte introduction to the mass spectrometer, which from liquid/gas chromatography separation may be <500 ms, and preferably <50 ms, to be able to take multiple spectra across the chromatography peaks that may have a duration of the order of a second.

Triple quadrupole mass spectrometer instruments, which are capable of performing MS1 and MS2 scans, for example may claim a polarity switching time down to 5 ms, which is dominated by the high-voltage switching times for the electrospray ion source and detector conversion dynode, with an additional delay for stabilisation of the electrospray plume and for ion transport. A 5 ms polarity switching time is equivalent to the loss of perhaps up to only a few spectra in a triple-quadrupole mass spectrometer, and thus experiments that incorporate polarity switching may run without compromising instrument operation beyond the fundamental compromise of splitting the acquisition time between two polarities. However, while triple quadrupole mass spectrometers have high polarity switching speed, they have relatively lower accuracy and poorer resolution than mass spectrometers incorporating high resolution accurate-mass (HRAM) analysers. In turn HRAM analysers have longer polarity switching times. Hence, it is desirable to provide methods and apparatus that use HRAM analysers but are not limited by their switching speeds. For example, slow switching speeds will result in deadtimes in which data is not collected and the presence of species may be missed.

Fast polarity switching in High Resolution Accurate Mass (HRAM) analysers, such as time-of-flight analysers and orbital trapping mass analysers, is challenging because these analysers typically require ppm stable high voltage electric potentials, which are often heavily filtered, with corresponding long delays to charge capacitances and stabilise voltage outputs. During the switching period, which may run to seconds or minutes, the mass analyser cannot be used. Few commercial HRAM instruments support pulsed polarity switching within a single experiment, the notable exceptions are modern orbital trapping mass analyser instruments such as the Orbitrap™ Exploris™ Series (by Thermo Fisher Scientific), which can switch polarity within 500 ms. As mentioned above, for chromatographic elution times of the order of a second, this is a burdensome dead time for the instrument. For this reason, pulsed polarity switching is rarely used within a single experiment.

The Orbitrap™ Exploris™ instrument accomplishes the relatively fast polarity switching by maintaining both positive and negative stable HV supplies to its critical central electrode, and switching between them via a high voltage transistor switch. This approach allows the number of components and capacitances between the switch and the electrode to be limited. The disadvantage is that the number of components is effectively doubled-up compared to a system that switches the polarity of an unregulated HV source. Hence, this approach is expensive and consumes space.

Other efforts have been made in the prior art to provide high resolution, high accuracy mass spectrometers that can operate to detect positive and negative ions from a sample.

One property that has been used by Furutani in U.S. Pat. No. 7,170,052 B2 is that the forces acting on ions are reversed for opposing polarities of the ions. U.S. Pat. No. 7,170,052 B2 makes use of this property to ionize and analyse both ion polarities simultaneously using two analysers within a hybrid instrument, one operating in each polarity. The instrument comprises a doubled up orthogonal time-of-flight (ToF) analyser, where positive and negative ions generated by a source are separated by their opposing directions of ion mobility for different polarities. The separated positive and negative ions are analysed by their respective polarity analysers. Since polarity switching is avoided so are its problems. A similar instrument is described by Wang in U.S. Pat. No. 7,649,170 B2.

Hybrid instruments incorporating multiple analysers have a general advantage that one analyser's strengths may compensate for the weaknesses of the other. In Furutani two analysers of the same type are used so no such advantage is seen. More often the analysers are of different types, for example the Orbitrap™ Fusion™ series (by Thermo Fisher Scientific) combine ion trap and orbital trapping mass analysers.

In U.S. Pat. No. 10,699,888 B2 by Giannakopulos is described an instrument combining an orbital trapping mass analyser and a multi-reflection time-of-flight (MR-ToF) analyser, with a quadrupole mass filter and collision cell for tandem mass spectrometry. This document describes using the slow, high accuracy orbital trapping mass analyser to generate full mass (MS1) scans whilst the fast, sensitive MR-ToF simultaneously provides fragment (MS2) spectra. The MR-ToF analyser is of an opposing mirror type, as described by Grinfeld in U.S. Pat. No. 9,136,101 B2, which is less amenable than the orbital trapping mass analyser to fast polarity switching. The mirror electrode structure requires four stable high voltages, and higher voltages still than the 5 KV of the central electrode of an orbital trapping mass analyser.

Although dual analyser HRAM mass spectrometers are known, none of them provide solutions to overcoming the significant deadtime of polarity switching of the analysers when MS1 and/or MS2 scans are required in both polarities.

Fast switching power supplies, such as described for orbital trapping mass analyser instruments, are relatively complicated and expensive. For analysers such as an MR-ToF with multiple stable HV supplies, the size and complexity become large, and is further exacerbated by higher voltages requiring even more expensive components.

SUMMARY OF THE INVENTION

The present invention is directed to methods of operating a dual analyser mass spectrometer which avoid lengthy deadtimes when ions or the ion beam is not used because the mass analysers are switching polarity.

In a first embodiment, to avoid deadtimes while the mass analyser(s) is/are switching polarity, the timing of ion acquisition and mass analyser switching may be offset from one analyser to the other. In this regard the polarity switching time of one mass analyser may be parallelised with acquiring ions and performing mass scans by the other mass analyser. The time period when the ion source and processing region are switching polarity may also be used efficiently, namely by one of the mass analysers acquiring ions immediately before the switching such that the mass analyser is performing a mass scan during the ion source and ion processing region deadtime.

In a second embodiment the polarities of the mass analysers are not changed such that one analyser performs mass scans at a first polarity and the other analyser performs mass scans at a second polarity opposite to the first. The ion source and ion processing region are polarity switched and respectively direct ions to one analyser and then the other analyser depending on polarity of the ions. This avoids the lengthy polarity switching times of the mass analysers. Again the time period when the ion source and processing region are switching polarity is used efficiently, namely by one of the mass analysers acquiring ions immediately before the switching such that the mass analyser is performing a mass scan during the ion source and processing region switching deadtime.

Accordingly, the first embodiment of the present invention provides a method of operating a dual analyser mass spectrometer to obtain MS1 and MS2 scans of positive and negative ions from a sample. The method may comprise: ionising the sample, in a source and ion processing region of the mass spectrometer, the ion source and ion processing region operating at a first polarity, to produce a plurality of ions; directing a first packet of ions of the plurality of ions to a first mass analyser and performing, by the first mass analyser at the first polarity, a first scan sequence comprising at least one MS1 scan or at least one MS2 scan of the ions in the first packet, and after performing the at least one MS1 scan or the at least one MS2 scan switching polarity of the first mass analyser to a second polarity; directing one or more second packets of ions of the plurality of ions to a second mass analyser and performing, by the second mass analyser at the first polarity, a second scan sequence comprising at least one MS1 scan or at least one MS2 scan of the ions in the one or more second packets, wherein at least part of the at least one MS1 scan or at least part of the at least one MS2 scan performed by the second mass analyser is performed during a first deadtime in which the first mass analyser is switching polarity.

By the terms "operating at a first polarity" or "operating at a second polarity" we mean that the respective ion source, ion guides/processing region, first mass analyser and/or second mass analyser are configured to operate for analysis of ions at the respective polarity. The first polarity may be positive or negative polarity, and the second polarity will be opposite to the first.

After ionising the ions, ions may be accumulated or collected for a period of time, such as in an ion trap, to produce packets of ions. A deadtime is a period when the first mass analyser or second mass analyser is not capable of accurate mass scans due to switching polarity, or the ion source and processing region are not ionising the sample because of switching polarity. For example, the first deadtime may be when the first mass analyser is switching polarity.

The method may further comprise, while the second mass analyser performs, at the first polarity, at least one MS1 scan or at least one MS2 scan of the ions in the one or more second packets, switching polarity of the source and ion processing region of the mass spectrometer to a second polarity. The method may further comprise repeating the steps of directing packets of ions and performing scans by the first and second mass analysers but at a second polarity.

A last MS1 or MS2 scan of the second scan sequence, performed by the second mass analyser at the first polarity, may be at least partly performed during a second deadtime in which the ion source and ion processing region are switching polarity to the second polarity.

The method may further comprise: after switching polarity of the ion source and ion processing region to the second polarity, ionising the sample in the ion source and ion processing region operating at the second polarity to produce a further plurality of ions; and directing a third packet of ions to the first mass analyser and performing, by the first mass analyser operating at the second polarity, a third scan sequence comprising at least one MS1 scan or at least one MS2 scan of the ions in the third packet.

The method may further comprise: after performing, at the first polarity by the second mass analyser, the at least one MS1 scan or the at least one MS2 scan of the ions in the one or more second packets, the at least part of at the least one MS1 scan or at least part of the at least one MS2 scan performed during a first deadtime in which the first mass analyser is switching polarity, switching the polarity of the second mass analyser to the second polarity; and directing one or more fourth packets of ions to the second mass analyser and performing, by the second mass analyser at the second polarity, a fourth scan sequence comprising at least one MS1 scan or at least one MS2 scan of the ions in the one or more fourth packets. The method, wherein, performing, by the first mass analyser operating at the second polarity, the at least one MS1 scan or the at least one MS2 scan of the ions in the third packet, may be at least partly performed during a third deadtime in which the second mass analyser is switching polarity to the second polarity.

The method wherein performing, by the first mass analyser operating at the first polarity, the at least one MS1 scan or the at least one MS2 scan of the ions in the first packet, is at least partly performed during a fourth deadtime in which the second mass analyser is switching polarity to the first polarity. The fourth deadtime may alternatively be considered the zeroth deadtime because it may occur when the first packet of ions is being sent to the first mass analyser, as well as after the fourth packet of ions have been sent to the second mass analyser.

There may be considered to be deadtimes when: i) the first analyser is switching polarity; ii) the second analyser is switching polarity; and iii) the ion source and processing region is switching polarity. Since the three deadtimes may be considered to occur for each polarity of operation, a method cycle such as comprising four scan sequences (such as MS1 and MS2 scans over both polarities), may be considered to include six deadtimes.

The third scan sequence, performed by the first mass analyser at the second polarity may comprise an MS1 scan. The method may further comprise: after directing the third packet of ions to the first mass analyser and initiating the third scan sequence, without switching polarity of the second mass analyser, directing one or more fourth packets of ions to the second mass analyser and performing, at the first polarity by the second mass analyser, one or more MS2 scans of the ions in the one or more fourth packets, at least part of the one or more MS2 scans performed while the first mass analyser is performing the MS1 scan.

The method may further comprise: after performing, at second polarity by the first mass analyser, the MS1 scan during the third scan sequence, switching the polarity of the source and ion processing region to the second polarity, and after the switching of the polarity of the source and ion processing region to the second polarity, directing one or more fifth packets of ions to the first mass analyser and performing, by the first mass analyser at the second polarity, a fifth scan sequence comprising one or more MS2 scans of the ions in the one or more fifth packets.

The second mass analyser may not be polarity switched and may only perform MS2 scans at the first polarity. Accordingly, the first mass analyser may perform the other scans, namely the MS1 and MS2 scans at the second polarity and the MS1 scan at the first polarity.

The method may be performed within a time period based on a width of a chromatographic peak of the sample as it elutes from a chromatography system. In general, each cycle (for example, corresponding to the combined duration of the first scan sequence and second scan sequence) should be similar or less than the chromatographic peak width, to capture each peak in positive and negative mode.

The first scan sequence may comprise one or more MS1 scans and the second scan sequence may comprise one or more MS2 scans. Alternatively, the first scan sequence may comprise one or more MS2 scans and the second scan sequence may comprise one or more MS1 scans. When MS2 scans are performed in a scan sequence, the scan sequence may comprise performing a plurality of MS2 scans respectively on a series of packets of ions sequentially directed to the respective analyser.

The first mass analyser may be an orbital trapping mass analyser and the second mass analyser may be an ion trap mass analyser or a time-of-flight mass analyser (e.g. MR-ToF), or vice versa.

The dual analyser mass spectrometer may comprise one or more ion traps such as curved linear ion traps or C-traps, and the method may comprise: at least one of the one or more ion traps, aggregating or collecting ions ionised by the source and ion processing region to form packets of ions, and, by the at least one ion trap, directing packets of ions to the first mass analyser and/or to the second mass analyser. In some embodiments, one mass analyser may aggregate ions to form packets and may selectively direct the packets of ions to the first mass analyser and second mass analyser. In other embodiments, each analyser may have its own ion trap and respectively aggregate ions to form packets and control injection of the ion packets to the respective analyser.

The first mass analyser and/or second mass analysers takes a time period of at least 50 ms, at least 100 ms, at least 200 ms or at least 500 ms, to switch polarity and recommence mass analysis.

The mass analysers are preferably high resolution accurate mass (HRAM) analysers. High resolution accurate mass (HRAM) analysers are analysers preferably having a resolving power of the order of, or greater than, around 10,000, and preferably having a mass accuracy of better than around 10 ppm.

The method may further comprise: further ionising the sample, at the first polarity, to produce a further plurality of ions; directing a further first packet of ions of the plurality of ions to the first mass analyser and performing, by the first mass analyser at the first polarity, a fifth scan sequence comprising at least one MS1 scan or at least one MS2 scan of the ions in the further first packet, and after performing the at least one MS1 scan or the at least one MS2 scan switching polarity of the first mass analyser to the second polarity; and directing one or more further second packets of ions of the plurality of ions to the second mass analyser and performing, by the second mass analyser at the first polarity, a sixth scan sequence comprising at least one MS1 scan or at least one MS2 scan of the ions in the one or more further second packets, wherein at least part of the at least one MS1 scan or at least part of the at least one MS2 scan performed by the second mass analyser is performed during a further first deadtime in which the first mass analyser is switching polarity.

The second embodiment of the present invention provides a method of operating a dual analyser mass spectrometer to obtain MS1 and MS2 scans of positive and negative ions from a sample. A first mass analyser may operate at a first polarity and a second mass analyser may operate at a second polarity opposite to the first polarity. In this embodiment the polarity of the mass analyser may be maintained constant without switching or reversing polarity. The method may comprise: ionising the sample, in an ion source and ion processing region of the mass spectrometer, the ion source and ion processing region operating at a first polarity, to produce a plurality of ions; directing one or more first packets of ions to the first mass analyser and initiating the performing, by the first mass analyser at the first polarity, of at least one MS1 scan and/or at least one MS2 scan of the ions in the one or more first packets; after initiating the at least one MS1 scan and/or at least one MS2 scan of the one or more first packets of ions by the first mass analyser, switching the polarity of the ion source and ion processing region to a second polarity opposite to the first polarity; and after switching polarity of the ion source and ion processing region to the second polarity, directing one or more second packets of ions to the second mass analyser and performing, by the second mass analyser at the second polarity, at least one MS1 scan and/or at least one MS2 scan of the ions in the second packet.

The first mass analyser may perform MS1 and MS2 scans at the first polarity and the second mass analyser may perform MS1 and MS2 scans at the second polarity.

At least part of the at least one MS1 scan and/or at least part of the at least one MS2 scan performed by the first mass analyser may be performed during a deadtime in which the polarity of the ion source and ion processing region is being switched to the second polarity.

The time period forming an MS1 scan, for the first mass analyser and/or second mass analyser, may be greater than the time period for performing an MS2 scan.

The one or more second packets of ions may comprise a plurality of second packets of ions, and while the first mass analyser is performing the MS1 scan, and after the ion source and ion processing region have switched polarity to the second polarity, the method may comprise performing by the second mass analyser one or more MS1 scans and one or more MS2 scans at the second polarity on the plurality of second packets of ions, and while the second mass analyser is performing a last scan of a sequence of the scans on the plurality of second packets of ions, switching the polarity of the ion source and ion processing region back to the first polarity, and after switching the ion source and ion processing region back to the first polarity directing one or more third packet of ions to the first mass analyser to perform one or more MS2 scans.

The second mass analyser may perform MS1 and MS2 scans at the second polarity while the first mass analyser performs the MS1 scan at the first polarity.

The one or more first packets of ions may comprise a first packet of ions, and the first mass analyser may perform, at the first polarity, an MS1 scan of the ions in the first packet of ions, and after switching polarity of the ion source and ion processing region to the second polarity and directing one or more second packets of ions to the second analyser, the second analyser may perform at the second polarity one or more MS2 scans on the one or more second packets of ions.

The method may further comprise: after performing one or more MS2 scans by the second analyser on the second packets of ions, directing a third packet of ions to the second analyser and performing by the second analyser at the second polarity an MS1 scan of the third packet of ions; after directing the third packet of ions to the second mass analyser to perform an MS1 scan and while the second mass analyser performs the MS1 scan of the third packet of ions, switching the polarity of the ion source and ion processing region to a second polarity opposite to the first polarity; and after switching polarity of the ion source and ion processing region to the second polarity, directing one or more fourth packets of ions to the first mass analyser and performing, by the first mass analyser at the first polarity, one or more MS2 scans of the ions in the one or more fourth packets.

The method may be performed within a time period based on a width of a chromatographic peak of the sample as it elutes from a chromatography system. In general, each cycle (for example, corresponding to the combined duration of the first scan sequence and second scan sequence) should be similar or less than the chromatographic peak width, to capture each peak in positive and negative mode.

MS2 scans on one of the first and second mass analysers may be performed in parallel (temporally) with an MS1 scan performed on the other of the first and second mass analysers.

The first mass analyser may be an orbital trapping mass analyser and the second mass analyser may be a time of flight mass analyser (e.g. MR-ToF) or an orbital trapping mass analyser, or vice versa.

The dual analyser mass spectrometer may comprise one or more ion traps such as curved linear ion traps or C-traps, and the method may comprise, at least one of the one or more ion traps, aggregating or collecting ions ionised by the source and ion processing region to form packets of ions, and, by the at least one of the ion traps, directing packets of ions to the first mass analyser and/or to the second mass analyser. In some embodiments, one mass analyser may aggregate ions to form packets and may selectively direct the packets of ions to the first mass analyser and second mass analyser. In other embodiments, each analyser may have its own ion trap and respectively aggregate ions to form packets and control injection of the ion packets to the respective analyser.

The first mass analyser and/or second mass analysers may take a time period of at least 50 ms, at least 100 ms, at least 200 ms or at least 500 ms, to switch polarity and recommence mass analysis.

The mass analysers may be high resolution accurate mass (HRAM) analysers. High resolution accurate mass (HRAM) analysers are analysers preferably having a resolving power of the order of, or greater than, around 10,000, and preferably having a mass accuracy of less than around 10 ppm The present invention further provides a mass spectrometer, comprising: an ion source and processing region, comprising: an ionisation source for producing a plurality of precursor ions from molecules of a sample; a mass filter; one or more ion traps configured to aggregate/collect ions ionised by the source and ion processing region to form packets of ions and selectively direct packets of ions to a first mass analyser and/or to a second mass analyser; the first mass analyser; a fragmentation apparatus; the second mass analyser; a controller configured to cause the mass spectrometer to perform any of the method set out herein. The present invention may further provide a system comprising the mass spectrometer and a chromatography system configured to separate molecules of a sample, wherein the chromatography system provides the separated molecules to the ionisation source.

The present invention provides a computer program comprising computer program instructions, which when run on a computer or controller configured to control a mass spectrometer cause the mass spectrometer to execute the steps of any of the method set out herein.

Although we have described herein the two analysers of the mass spectrometer as comprising an orbital trapping mass analyser along with of the following: an ion trap, a ToF analyser, or a second orbital trapping mass analyser, other combinations of analyser are possible. For example, other mass analysers might be an FTICR, quadrupole, sector or electrostatic trap. The first and second analysers may comprise the following alternative combinations: FTICR and ToF, or electrostatic trap and ToF.

Herein the term mass may be used to refer to the mass-to-charge ratio, m/z. The resolution of a mass analyser is to be understood to refer to the resolution of the mass analyser as determined at a mass to charge ratio of 200 unless otherwise stated.

BRIEF DESCRIPTION OF THE DRAWINGS

Embodiments of the present invention, and aspects of the prior art, will now be described with reference to the accompanying drawings, of which.

DETAILED DESCRIPTION

Figure 1:
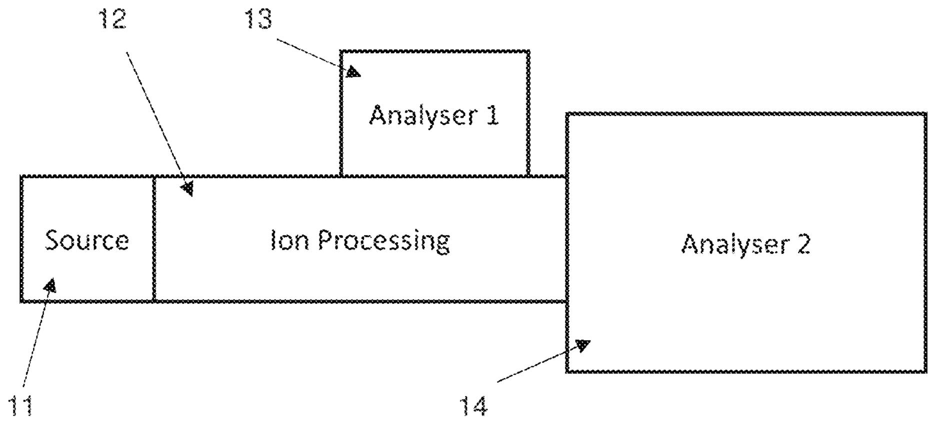
FIG. 1 is a schematic layout of a dual analyser hybrid mass spectrometer.

FIG. 1 shows a schematic arrangement of a mass spectrometer 1 suitable for carrying out methods in accordance with embodiments of the present invention. The mass spectrometer is a dual analyser mass spectrometer and comprises an ion source 11, such as an electrospray ionisation (ESI) source, an ion processing region 12, which may comprise various electrodes to generate fields for refining and filtering the ion beam and selecting desired ion m/z ranges. In the arrangement shown in FIG. 1, the first analyser 13 is shown away from the direction of the axis of the ion beam in the ion processing region 12, such as transverse to it. The second analyser 14 is shown as terminating the direction of the ion beam in the ion focusing region 12. Other arrangements of dual analysers may be provided and will be discussed later in this description.

A sample to be analysed is supplied to the mass spectrometer 1, for example from a liquid chromatographic apparatus such as a liquid chromatography (LC) column (not shown in FIG. 1). One such example of an LC column is the Thermo Fisher Scientific, Inc ProSwift™ monolithic column which offers high performance liquid chromatography (HPLC) through the forcing of the sample carried in a mobile phase under high pressure through a stationary phase of irregularly or spherically shaped particles constituting the stationary phase. In the HPLC column, sample molecules elute at different rates according to their degree of interaction with the stationary phase. A chromatograph may be produced by measuring over time the quantity of sample molecules which elute from the HPLC column using a detector, which is the mass spectrometer.

Sample molecules which elute from the HPLC column will be detected as a peak above a baseline measurement on the chromatograph. Where different sample molecules have different elution rates, a plurality of peaks on the chromatograph may be detected. Preferably, individual sample peaks are separated in time from other peaks in the chromatogram such that different sample molecules do not interfere with each other. On a chromatograph, a presence of a chromatographic peak corresponds to a time period over which the sample molecules are present at the detector. As such, a width of a chromatographic peak is equivalent to a time period over which the sample molecules are present at the detector. Preferably, a chromatographic peak has a Gaussian shaped profile, or can be assumed to have a Gaussian shaped profile. Accordingly, a width of the chromatographic peak can be determined based on a number of standard deviations calculated from the peak. For example, a peak width may be calculated based on 4 standard deviations of a chromatographic peak. Alternatively, a peak width may be calculated based on the width at half the maximum height of the peak. Other methods for determining the peak width known in the art may also be suitable. The sample molecules thus separated via liquid chromatography are then provided to the mass spectrometer ion source 11.

Figure 2:
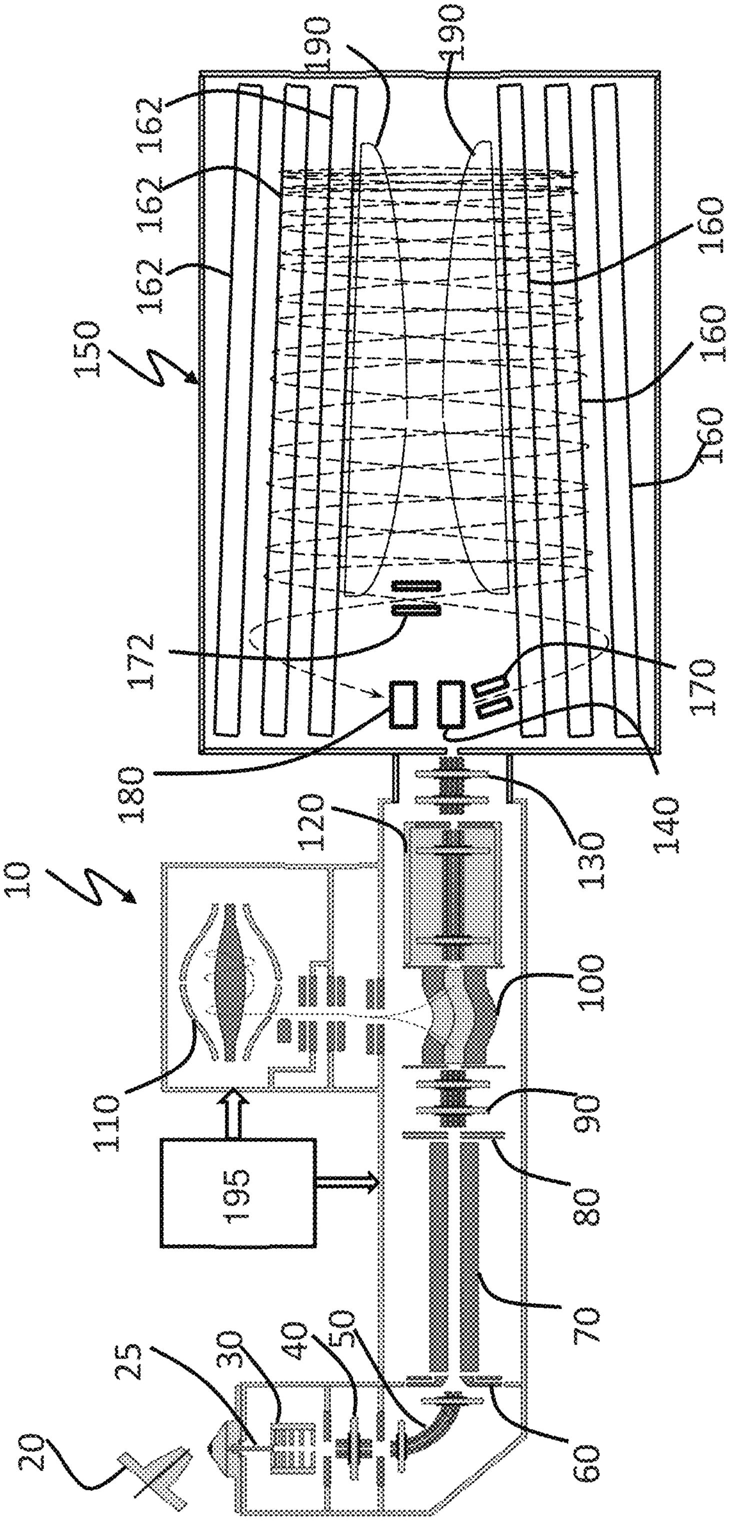
FIG. 2 is a schematic diagram of a dual analyser mass spectrometer for carrying out the present invention.

We now describe with reference to FIG. 2 a detailed example of a dual analyser mass spectrometer of FIG. 1. The dual analyser mass spectrometer 10 of FIG. 2 comprises as the ion source an electrospray ionization source (ESI source) 20 which is at atmospheric pressure. The sample molecules, e.g. received from the HPLC column, are ionized by the ESI source 20. Ions produced from the sample then enter a vacuum chamber of the mass spectrometer 10 and are directed by a capillary 25 into an RF-only S lens 30. The ions are focused by the S lens 30 into an injection flatapole 40 which injects the ions into a bent flatapole 50 with an axial field. The bent flatapole 50 guides (charged) ions along a curved path through it whilst unwanted neutral molecules such as entrained solvent molecules are not guided along the curved path and are lost.

An ion gate (TK lens) 60 is located at the distal end of the bent flatapole 50. The ion gate may be an ion lens with static fields providing good fringe field properties and transmitting ions cleanly to quadrupole mass filter 70. In some embodiments, the ion gate may control the passage of the ions from the bent flatapole 50 to the quadrupole mass filter 70. The quadrupole mass filter 70 is typically but not necessarily segmented and serves as a band pass filter, allowing passage of a selected mass number or limited mass range whilst excluding ions of other mass to charge ratios (m/z). The mass filter can also be operated in an RF-only mode in which it is not mass selective, i.e. it transmits substantially all m/z ions. For example, the quadrupole mass filter 70 may be controlled by controller 195 to select a range of mass to charge ratios to pass of the precursor ions which are allowed to pass, whilst the other ions in the precursor ion stream are filtered (i.e. not allowed to pass). Alternatively, the S lens 30 may be operated as an ion gate and the ion gate (TK lens) 60 may be a static lens.

Although a quadrupole mass filter is shown in FIG. 2, the skilled person will appreciate that other types of mass selection devices may also be suitable for selecting precursor ions within the mass range of interest. For example, an ion separator as described in US-A-2015287585, an ion trap as described in WO 2013/076307 A, an ion mobility separator as described in US 2012/256083 A, an ion gate mass selection device as described in WO 2012/175517 A, or a charged particle trap as described in U.S. Pat. No. 799,223, the contents of which are hereby incorporated by reference in their entirety. The skilled person will appreciate that other methods of selecting precursor ions according to ion mobility, differential mobility and/or transverse modulation may also be suitable.

The isolation of a plurality of ions of different masses or mass ranges may also be performed using the method known as synchronous precursor scanning (SPS) in an ion trap. Furthermore, in some embodiments, more than one ion selection or mass selection device may be provided. For example, a further mass selection device may be provided downstream of the fragmentation chamber 120. In this way, $MS^3$ or $MS^n$ scans can be performed if desired (typically using the TOF mass analyser for mass analysis).

Following mass selection, ions pass through a quadrupole exit lens/split lens arrangement 80 and into a first transfer multipole 90. The quadrupole exit lens/split lens arrangement 80 may be used to control admission of ions to mass analysers. The first transfer multipole 90 guides the mass filtered ions from the quadrupole mass filter 70 into a curved linear ion trap (C-trap) 100. The C-trap (first ion trap) 100 has longitudinally extending, curved electrodes which are supplied with RF voltages and end caps to which DC voltages are supplied. The result is a potential well that extends along the curved longitudinal axis of the C-trap 100. In a first mode of operation, the DC end cap voltages are set on the C-trap so that ions arriving from the first transfer multipole 90 are captured in the potential well of the C-trap 100, where they are cooled. The injection time (IT) of the ions into the C-trap determines the number of ions (ion population) that is subsequently ejected from the C-trap into the mass analyser.

Cooled ions reside in a cloud towards the bottom of the potential well and are then ejected orthogonally from the C-trap towards the first mass analyser 110. As shown in FIG. 2, the first mass analyser is an orbital trapping mass analyser 110, for example the Orbitrap® mass analyser sold by Thermo Fisher Scientific, Inc. The orbital trapping mass analyser 110 has an off-centre injection aperture and the ions are injected into the orbital trapping mass analyser 110 as coherent packets, through the off-centre injection aperture. Ions are then trapped within the orbital trapping mass analyser by a hyperlogarithmic electric field, and undergo back and forth motion in a longitudinal direction whilst orbiting around the inner electrode.

The axial (z) component of the movement of the ion packets in the orbital trapping mass analyser is (more or less) defined as simple harmonic motion, with the angular frequency about the z-axis direction being related to the square root of the mass to charge ratio of a given ion species. Thus, over time, ions separate in accordance with their mass to charge ratio.

Ions in the orbital trapping mass analyser 110 are detected by use of an image detector (not shown) which produces a "transient" in the time domain containing information on all of the ion species as they pass the image detector. The transient is then subjected to a Fast Fourier Transform (FFT) resulting in a series of peaks in the frequency domain. From these peaks, a mass spectrum, representing abundance/ion intensity versus m/z, can be produced.

In the configuration described above, the sample ions (more specifically, a mass range segment of the sample ions within a mass range of interest, selected by the quadrupole mass filter 70) are analysed by the orbital trapping mass analyser without fragmentation. The resulting mass spectrum is denoted MS1.

If it is desired to perform an MS2 scan using the orbital trapping analyser, the mass spectrometer operates in a second mode in which it is necessary to first fragment the ions. In such a case the ions are delivered through to the fragmentation chamber 120 for cooling and fragmentation. The fragmented ions are then shuttled back to the C-trap 100 where they are pulse extracted into the orbital trapping analyser 110 for mass analysis.

In this second mode of operation, ions passing through the quadrupole exit lens/split lens arrangement 80 and first transfer multipole 90 into the C-trap 100 continue their path through the C-trap and into the fragmentation chamber 120. As such, the C-trap effectively operates as an ion guide in the second mode of operation. The fragmentation chamber 120 is, in the mass spectrometer 10 of FIG. 2, a higher energy collisional dissociation (HCD) device to which is supplied a collision gas, such as an inert gas, for example, argon, nitrogen or helium. Precursor ions arriving into the fragmentation chamber 120 collide with collision gas molecules resulting in fragmentation of the precursor ions into fragment ions.

Although an HCD fragmentation chamber 120 is shown in FIG. 2, other fragmentation devices may be employed instead, employing such methods as collision induced dissociation (CID), electron capture dissociation (ECD), electron transfer dissociation (ETD), photodissociation, and so forth.

As mentioned above, for MS2 analysis by the orbital trapping analyser 110 the fragmented ions are shuttled back to the C-trap 100 and directed transversely to the C-trap axis towards the orbital trapping analyser 110. Alternatively, MS2 analysis may be performed by a second mass analyser, which as shown in the embodiment of FIG. 2 may be a time-of-flight mass analyser 150. In such a case the fragmented ions may be ejected from the fragmentation chamber 120 at the opposing axial end to the C-trap 100. The ejected fragmented ions pass into a second transfer multipole 130. The second transfer multipole 130 guides the fragmented ions from the fragmentation chamber 120 into an extraction trap (second ion trap) 140. The extraction trap 140 is a radio frequency voltage controlled trap containing a buffer gas. For example, a suitable buffer gas is argon at a pressure in the range $5\times10^{-4}$ mBar to $1\times10^{-2}$ mBar. The extraction trap has the ability to quickly switch off the applied RF voltage and apply a DC voltage to extract the trapped ions. A suitable flat plate extraction trap, also referred to as a rectilinear ion trap, is further described in U.S. Pat. No. 9,548,195 (B2). Alternatively, a C-trap may also be suitable for use as a second ion trap.

The extraction trap 140 is provided to form an ion packet of fragmented ions, prior to injection into the second analyser. The extraction trap 140 accumulates fragmented ions prior to injection of the fragmented ions into the time of flight mass analyser 150.

Although an extraction trap (ion trap) is shown in the embodiment of FIG. 2, the skilled person will appreciate that other methods of forming an ion packet of fragmented ions will be equally suitable for the present invention. For example, relatively slow transfer of ions through a multipole can be used to affect bunching of ions, which can subsequently be ejected as a single packet to the ToF mass analyser. Alternatively orthogonal displacement of ions may be used to form a packet. Further details of these alternatives are found in US 2003/0001088 A1 which describes a travelling wave ion bunching method, the contents of which are herein incorporated by reference.

In FIG. 2, the time of flight mass analyser 150 shown is a multiple reflection time of flight mass analyser (MR-ToF) 150. The MR-ToF 150 is constructed around two opposing ion mirrors 160, 162, elongated in a drift direction. The mirrors are opposed in a direction that is orthogonal to the drift direction. The extraction trap 140 injects ions into the first mirror 160 and the ions then oscillate between the two mirrors 160, 162. The angle of ejection of ions from the extraction trap 140 and additional deflectors 170, 172 allow control of the energy of the ions in the drift direction, such that ions are directed down the length of the mirrors 160, 162 as they oscillate, producing a zig-zag trajectory. The mirrors 160, 162 themselves are tilted relative to one another, producing a potential gradient that retards the ions' drift velocity and causes them to be reflected back in the drift dimension and focused onto a detector 180. The tilting of the opposing mirrors would normally have the negative side-effect of changing the time period of ion oscillations as they travel down the drift dimension. This is corrected with a stripe electrode 190 (to act as a compensation electrode) that alters the flight potential for a portion of the inter-mirror space, varying down the length of the opposing mirrors 160, 162. The combination of the varying width of the stripe electrode 190 and variation of the distance between the mirrors 160, 162 allows the reflection and spatial focusing of ions onto the detector 180 as well as maintaining a good time focus. A suitable MR-ToF analyser 150 for use in the present invention is further described in US 2015/028197 A1, the contents of which are hereby incorporated by reference in its entirety.

We have described above a number of modes of operation. Firstly, we described that an MS1 scan may be performed by the first mass analyser (the orbital trapping mass analyser 110). Secondly, we described that the precursor ions may be fragmented and MS2 scans may be performed by the first mass analyser (the orbital trapping mass analyser 110) or the second mass analyser (the time-of-flight mass analyser) depending on whether the fragmentation chamber is controlled to eject the ions back towards the C-trap 100 or forwards to the second transfer multipole 130. In a further mode of operation the second mass analyser (time-of-flight mass analyser 150) may perform MS1 scans of ions. In this mode of operation the ions are directed axially through the C-trap 100 to the fragmentation chamber, but no fragmentation gases are input and the ions are guided to the second transfer multipole 130 without fragmentation. The ions can then be accumulated into packets in the extraction trap 140 as described above.

Returning to FIG. 2, ions accumulated in the extraction trap are injected into the MR-ToF analyser 150 as a packet of ions, once a predetermined number of ions have been accumulated in the extraction trap. By ensuring that each packet of ions injected into the MR-ToF 150 has at least a predetermined (minimum) number of ions, the resulting packet of ions arriving at the detector will be representative of the entire mass range of interest of the MS1 or MS2 spectrum. A single packet of precursor ions or fragmented ions is sufficient to acquire MS1 or MS2 spectra respectively. For MS2, this represents an increased sensitivity compared to conventional acquisition of time of flight spectra in which multiple spectra typically are acquired and summed for each given mass range segment. Preferably, a minimum total ion current (TIC) in each mass window is accumulated in the extraction trap before injection to the time of flight mass analyser. For example, at least N spectra (scans) are acquired per second in the MS2 domain by the time of flight mass analyser, wherein N=50, or more preferably 100, or 200, or more.

Preferably, at least X % of the MS2 scans contain more than Y ion counts (wherein X=30, or 50, or 70, or most preferably 90, or more, and Y=200, or 500, or 1000, or 2000, or 3000, or 5000, or more). Most preferably, at least 90% of the MS2 scans contain more than 500 ion counts, or more preferably more than 1000 ion counts, and ideally more than 5000 ion counts. This provides for an increased dynamic range of MS2 spectra. The desired ion counts for each of the MS2 scans may be provided by adjusting the number ions included in each packet of fragmented ions. For example, in the embodiment of FIG. 2, the accumulation time of the extraction trap may be adjusted to ensure that a sufficient number of ions have been accumulated. As such, the controller 195 may be configured to determine that a suitable packet of fragmented ions has been formed when either a predetermined number of ions are present in the extraction trap, or a predetermined period of time has passed. The predetermined period of time may be specified in order to ensure that the time of flight mass analyser operates at the desired frequency when the flow of ions to the extraction trap is relatively low.

The mass spectrometer 10 is under the control of a controller 195 which, for example, is configured to control the timing of ejection of the trapping components, to set the appropriate potentials on the electrodes of the quadrupole etc. so as to focus and filter the ions, to capture the mass spectral data from the orbital trapping device 110, to capture the mass spectral data from the MR-ToF 150, control the sequence of MS1 and MS2 scans and so forth. It will be appreciated that the controller 195 may comprise a computer that may be operated according to a computer program comprising instructions to cause the mass spectrometer to execute the steps of the method according to the present invention.

It is to be understood that the specific arrangement of components shown in FIG. 2 is not essential to the methods subsequently described. Indeed other arrangements for carrying out the methods of embodiments of the present invention are suitable.

Although an orbital trapping mass analyser 110 is shown in FIG. 2, other Fourier Transform mass analysers may be employed instead. For example, a Fourier Transform Ion Cyclotron Resonance (FTICR) mass analyser may be utilised as mass analyser for the MS1 scans. Mass analysers, such as the orbital trapping mass analyser and Ion Cyclotron Resonance mass analyser, may also be used in the invention even where other types of signal processing than Fourier transformation are used to obtain mass spectral information from the transient signal (see for example WO 2013/171313).

An example method will now be described with reference to FIG. 3, in which sample molecules are supplied from a liquid chromatography (LC) column to the exemplary apparatus described above (as shown in FIG. 2). The sample ions are supplied from the LC column to acquire data about the sample. Data is acquired for the entire elution period, which is usually controlled by the length of a solvent gradient (a switch between pumping aqueous solvent over a column to organic solvent). Mass scans may be collected over a repeating cycle. It is preferable if each scan, or scan cycle, for a mass range of interest or list of precursors occurs over a duration or timescale corresponding to the elution of a chromatographic peak or less.

Figure 3:
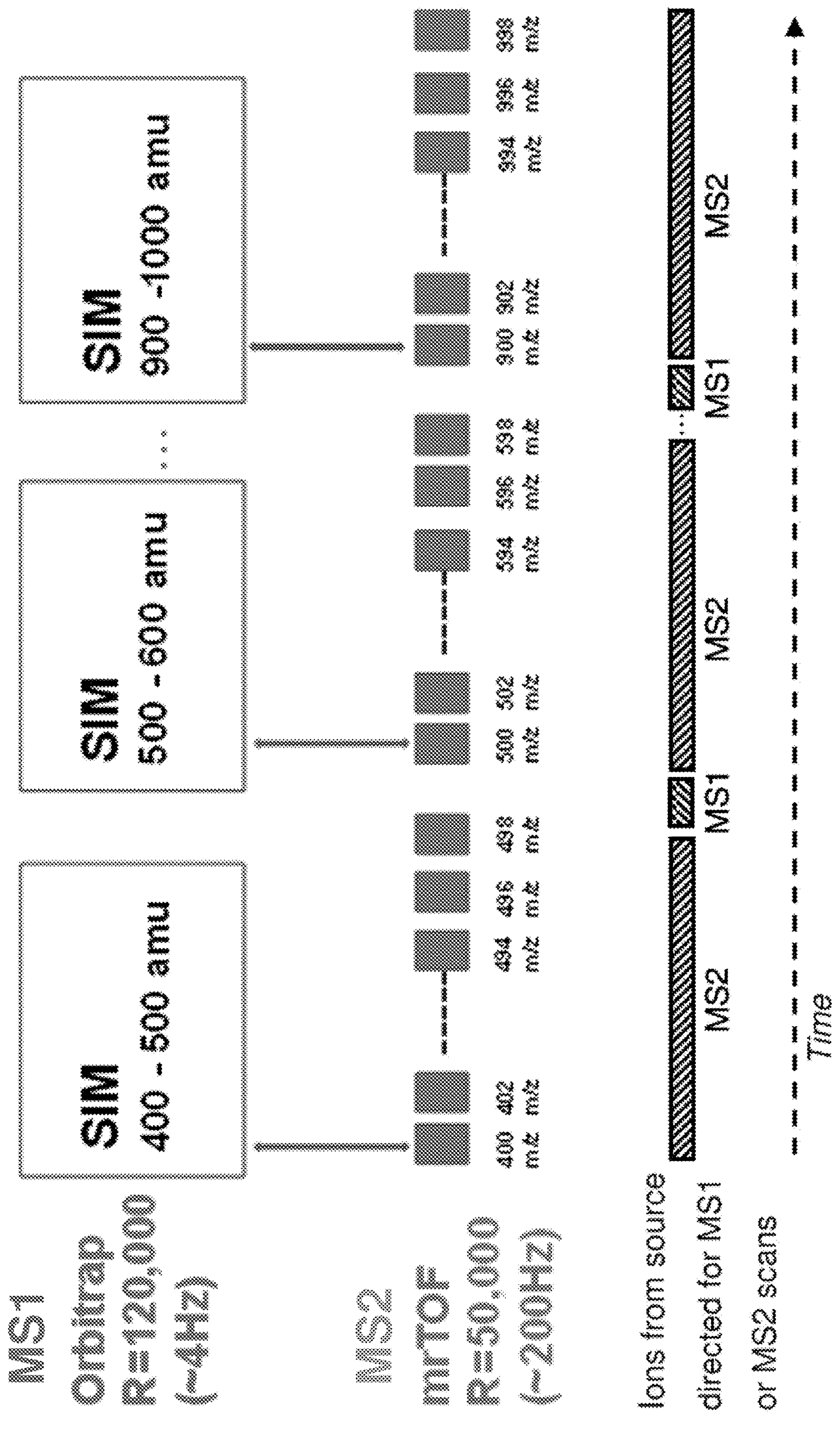
FIG. 3 is diagram showing example timings of performing MS1 and MS2 scans.

As shown in FIG. 3, the orbital trapping mass analyser (denoted "Orbitrap") is utilised to perform a plurality of MS1 scans across a mass range of interest. For example, as shown in FIG. 3, the mass range of interest (or Selected Ion Monitoring, SIM) to be analysed is 400-1000 m/z. Within the mass range of interest, a plurality of MS1 scans are performed using mass sub ranges of the precursor ions of the mass range of interest. Alternatively, a single MS1 scan may be performed using precursor ions from the entire mass range of interest (i.e. 400-1000 amu in this example).

In order to perform a single MS1 scan, sample molecules from an LC column are ionized using the ESI source 20. Sample ions subsequently enter the vacuum chamber of the mass spectrometer 10. The sample ions are directed through capillary 25, RF-only lens 30, injection flatapole 40, bent flatapole 50 and into the quadrupole mass filter 70 in the manner as described above. The quadrupole mass filter 70 is controlled by the controller 195 to filter the sample ions according to the selected precursor mass sub-range of interest. For example, as shown in FIG. 3 MS1 scans are performed across a mass range of interest from 400 m/z to 1000 m/z in precursor mass sub-ranges of 400-500 m/z, 500-600 m/z . . . to 900-1000 m/z. Ions then pass through the quadrupole exit lens/split lens arrangement 80, through the transfer multipole 90 and into the C-trap 100 where they are accumulated. From the C-trap 100, (precursor) sample ions of the mass range segment may be injected into the orbital trapping mass analyser 110. Once ions are stabilised inside the orbital trapping mass analyser, the MS1 scan is performed by using the image current detector to detect the ions present in the orbital trapping mass analyser 110. The detection of the ions in the orbital trapping mass analyser is configured to be performed with a relatively high resolution for the MS1 scan (relative to the resolution of the MS2 scans). For example, a resolution (R) of at least 50,000, or preferably at least 100,000 may be used for each MS1 scan (see Resolution R=120,000 in FIG. 3).

By using a Fourier Transform mass analyser (for example, an orbital trapping mass analyser), the MS1 scans are performed with a high degree of mass accuracy. Preferably, the MS1 scans are performed with a mass accuracy of less than 5, or more preferably 3 parts per million (ppm).

In tandem with the MS1 scans, a plurality of MS2 scans are performed, as shown in FIG. 3. In the method of FIG. 3, the MS2 scans are performed using the time of flight mass analyser, MR-ToF. In other embodiments, a different mass analyser may be used.

In order to perform a single MS2 scan of a mass range segment, sample molecules from the LC column are ionized and injected into the mass spectrometer in a similar manner to the MS1 scan. The sample ions for the MS2 scan progress through the capillary 25, RF-only lens 30, injection flatapole 40, bent flatapole 50 and into the quadrupole mass filter 70 in a similar manner to the sample ions for the MS1 scan. Once the sample ions for the MS2 scan reach the quadrupole mass filter 70, the quadrupole mass filter 70 is controlled by the controller 195 to filter the sample ions according to the relatively narrow mass range segment being scanned. Each precursor mass range segment may have a mass range of, for example, no greater than 5 amu, or preferably no greater than 3 amu, or more preferably no greater than 2 amu (as shown in FIG. 3). The (filtered mass range segment) precursor ions pass from the quadrupole mass filter 70 through to the C-trap 100 as described above for the MS1 scan. The controller 195 then controls the C-trap to allow the precursor ions to pass through in an axial direction towards the fragmentation chamber 120. In the HCD fragmentation chamber 120, the precursor ions collide with collision gas molecules which results in the fragmentation of the precursor ions into fragment ions. The fragmented ions for the mass range segment are then ejected from the fragmentation chamber at the opposing axial end to the C-trap 100. The ejected fragmented ions pass into a second transfer multipole 130. The second transfer multipole 130 guides the fragmented ions from the fragmentation chamber 120 into an extraction trap (second ion trap) 140 where they are accumulated. The fragmented ions may be accumulated in the extraction trap 140 for a predetermined time. Fragmented ions are then injected from the extraction trap into the MR-ToF. The prior accumulation of fragmented ions in the extraction trap allows the fragmented ions to be injected as a packet into the MR-ToF. The packet of ions travels along the flight path of the MR-ToF undergoing multiple reflections before being detected at the detector. The varying arrival times of the fragmented ions within the packet allows a MS2 mass spectrum for the packet of fragmented ions to be generated. The length of the flight path of the MR-ToF in combination with the time resolution of the detector allows the MR-ToF to perform MS2 scans at a resolution in excess of 40,000 (see R=50,000 in FIG. 3).

One benefit of the packet-based approach to the analysis is that once the accumulated ions are ejected from the extraction trap 140, the ions for the next mass range segment can begin to fill the extraction trap. As such, ions from one mass range segment can be travelling through the MR-ToF while the ions for the next mass range segment are being accumulated. Thus, a greater number of ion counts can be achieved within a chromatographic peak due to the use of the accumulated packet based injection of fragmented ions into the MR-ToF from the extraction trap. This is true whether MS1 or MS2 scans are being acquired or even when switching from MS1 to MS2 scans or vice versa.

The controller 195 controls the mass spectrometer 10 to perform a plurality of MS1 scans of the mass sub-ranges for the mass range of interest, and in tandem the plurality of MS2 scans of the mass range segments over the mass range of interest. In order to acquire a more accurate sample of the chromatographic peak, the controller 195 may repeat the scan cycle a number of times over the duration of the chromatographic peak. For example, a single cycle may take around 1.5 s to perform. As such, the cycle may be performed, for example, at least 7 times, or more preferably at least 9 times over the duration of a chromatographic peak. This enables the MS1 and/or MS2 spectral data to be used for quantitation of the eluting sample in the chromatographic peak. In some modes of operation a single operation of the cycle may be sufficient.

FIG. 3 shows MS1 and MS2 collection for a single polarity. The foot of the figure shows how the ions from the source are distributed to the two analysers for MS1 and MS2 acquisition. It can be seen that for more of the time the ions from the ion source are directed to the MR-ToF for MS2 acquisition.

When it is desired to collect MS1 and/or MS2 scans over both polarities, as discussed, HRAM analysers have a lengthy polarity switching time which results in a deadtime in which the analyser(s) are not able to perform reliable scans. This is caused by the time it takes for the voltage supplies for the mass analysers to stabilize after polarity switching. Although there is also some deadtime during which the ion source and ion guide region are switching polarity this is much less than the deadtime for the analysers.

Embodiments of the present invention are directed to maximising use of ions, such as ions eluting from a sample from a liquid chromatography (LC) column, such that temporal gaps in the acquisition of mass scans are minimized so as that all ion species or fragmented ion species of interest may be analysed. FIGS. 4-8 show methods of performing mass spectrometry, using a dual analyser mass spectrometer, according to embodiments of the present invention. In FIGS. 4-8 positive polarity operation of the ion source/ion guides and mass analysers is shown by thick black lines, whereas negative polarity operation of the ion source/ion guides and mass analysers is shown by thin double grey lines.

Embodiments of the present invention comprise covering the polarity switching deadtime of one analyser by diverting the ion beam to a second analyser. This way the ion beam is always being efficiently utilised with only the short polarity switching time of the source and ion guide region creating dead periods. To explain further, if we consider the instruments of FIG. 1 or FIG. 2, we can separate the instrument into sections and configure the polarities for each section independently, for example, for the ion source, ion processing region, first mass analyser and second mass analyser. For the mass spectrometer of FIG. 2 the ion source corresponds to the ESI source 20, and the ion processing region corresponds to the capillary 25, RF-only lens 30, injection flatapole 40, bent flatapole 50, ion gate 60, quadrupole mass filter 70, exit lens/split lens arrangement 80, transfer multipole 90 and C-trap 100. The polarity of the components in the ion processing region and ion source are preferably switched together. Depending on the scan being performed the fragmentation chamber 120, second transfer multipole 130 and the extraction trap 140 may also be switched polarity with the ion processing region. Further division or subdivision of the switching of the ion source and processing region is possible, depending on the implementation and scan being performed. In the embodiment of FIG. 2, the first mass analyser is the orbital trapping analyser 110 and switching polarity of the orbital trapping analyser 110 may comprise switching the orbital trapping analyser and injection optics (shown between reference numbers 100 and 110 in FIG. 2). Also in the embodiment of FIG. 2, the second analyser is the MR-ToF analyser 150 and switching polarity of the MR-ToF analyser may comprise switching polarity of items 160-180 and may additionally comprise switching the second transfer multipole 130 and extraction trap (second ion trap) 140. Many of the components in the ion source and ion guide/processing region switch relatively quickly, although the C-trap 100 to orbital trapping analyser extraction DC voltages may be slower but are only required for an orbital trapping analyser scan.

The ion source and ion processing region will generally operate with the same polarity. To avoid loss of use of ions while one mass analyser is switching, the ion beam or ions are switched to the other analyser. Different types of analysers have different switching times so the optimum method for a particular pair of analysers will depend on their types and switching times.

In FIGS. 2 and 3 we considered a dual mass analyser instrument in which the first analyser was an orbital trapping analyser (Orbitrap™ analyser) and the second analyser was a multiple reflection time of flight mass analyser (MR-ToF).

Figure 4:
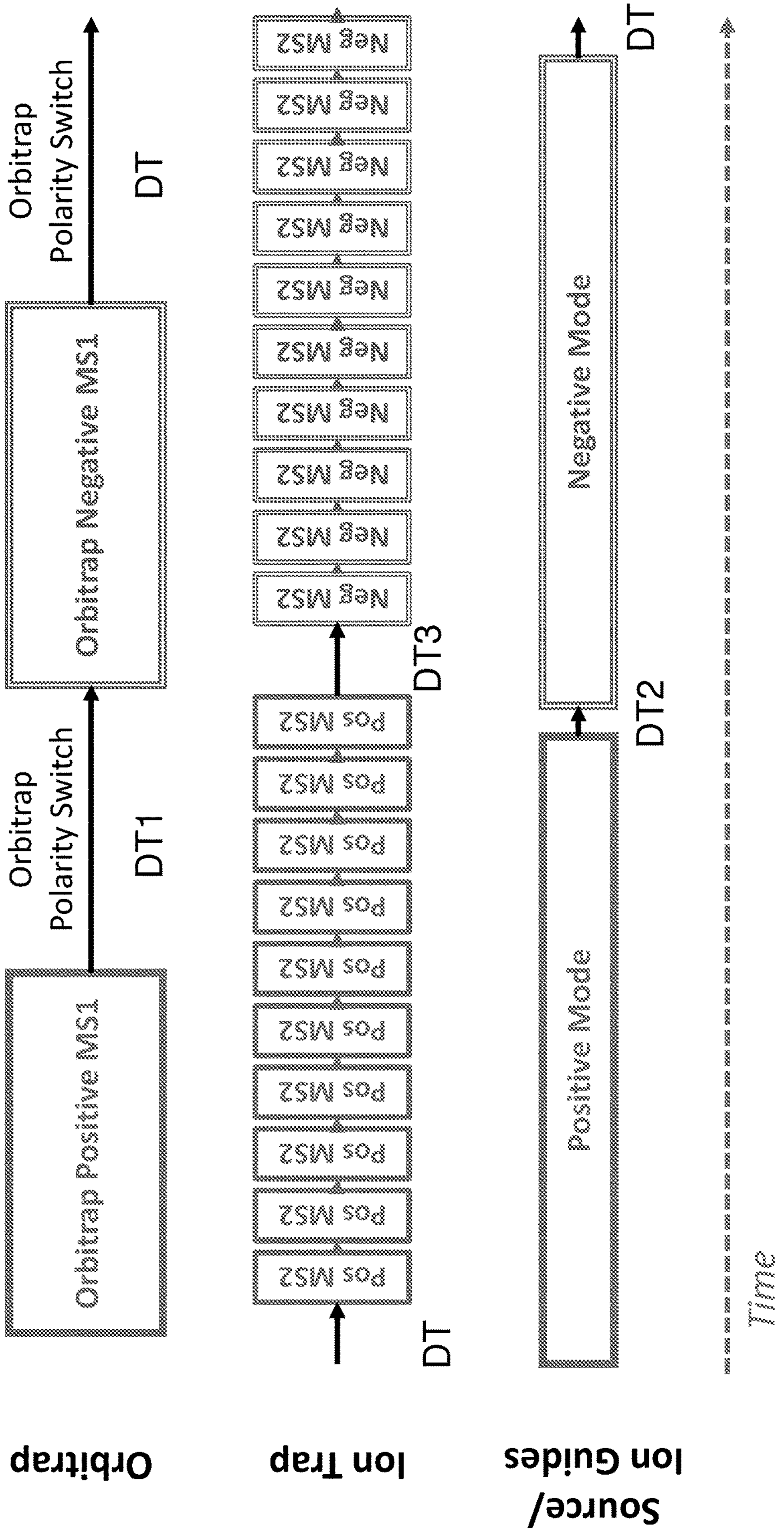
FIG. 4 shows a method of performing dual polarity tandem mass spectrometry with an orbital trapping mass analyser and ion trap analyser hybrid instrument according to an embodiment of the present invention.

As a first embodiment, we consider switching of an instrument in which the first analyser is an orbital trapping analyser and the second analyser is an ion trap. Such an instrument is equivalent to the Orbitrap™ Fusion™ (by Thermo Fisher Scientific). The orbital trapping analyser may have a polarity switching time of ~500 ms. This is a relatively lengthy switching time but is compatible with chromatography peak elution timescales. The orbital trapping analyser produces high quality full mass scans that require substantial ion processing time. The ion trap is sensitive and switches polarity more quickly, in ~20 ms. For MS1 spectra a mass analyser with high resolution and mass accuracy is required, whereas for MS2 spectra high sensitivity and speed are required. FIG. 4 shows a timeline for a dual mass analyser instrument using the orbital trapping analyser for MS1 scans and the ion trap for MS2 scans.

As can be seen in FIG. 4, the two polarities are covered by having a first phase in which the ion source, ion guides/processing region, first mass analyser (orbital trapping analyser) and second mass analyser (ion trap) all operate at a first polarity which is positive. By the term "operating at a first polarity" we mean that the respective ion source, ion guides/processing region, first mass analyser and second mass analyser are configured to operate for analysis of ions at the first polarity. For example, for the ion source this may mean that the sprayer is set to a high positive voltage (+4 KV), to produce positive ions, and that downstream electrodes possess a broadly negative DC voltage progression to encourage positive ions to move through them. Applied RF potentials that provide radial focusing are by nature polarity independent. Following the first phase operating at a first polarity which is positive, in a second phase the ion source, ion guides/processing region, first mass analyser (orbital trapping analyser) and second mass analyser (ion trap) all operate at a second polarity which is negative. On completion of the second phase the polarities of the ion source, ion guides/processing region, first mass analyser (orbital trapping analyser) and second mass analyser (ion trap) may again be switched to operate at the first polarity, namely positive. Alternatively, the first polarity may be negative and the second polarity may be positive.

Looking more closely at the timing of switching polarity in FIG. 4, the deadtime (DT1) of switching polarity of the orbital trapping analyser is used by the ion trap for MS2 acquisition, whereas the deadtime of switching the ion trap is used by the orbital trapping mass analyser for MS1 acquisition. The orbital trapping analyser, having loaded ions from the ion source, takes a relatively long time to generate the MS1 spectrum and during this time, after the ion trap has switched polarity, the acquisition of MS2 spectra can commence. Multiple MS2 spectra may be collected while the MS1 spectrum is generated. After the orbital trapping analyser has completed MS1 acquisition the polarity of the orbital trapping analyser may be switched to get it ready for when the ion source and ion guides/processing region are also switched polarity. The ion trap continues in the positive mode collecting MS2 spectra during this deadtime of orbital trapping analyser switching. In this way maximum use of ions from the ion source may be made. Collection of ions and generation of MS2 spectra continues with the ions source and ion guides/processing region, along with the ion trap, operating at the first polarity, namely positive polarity, until the final MS2 spectra is commenced. At this point, after the ions are collected for the final MS2 spectrum at the first polarity, the ion source and ion guides/processing region are switched to the second polarity. The ion trap continues processing the final MS2 spectra at the first polarity during the relatively short deadtime (DT2) of switching polarity of the ion guide and processing region. After the ion source and ions guides/processing region has switched polarity and the orbital trapping analyser has also switched polarity the acquisition of MS1 spectra at the second polarity may commence. The ion trap may be completing the final MS2 acquisition while the orbital trapping analyser is starting its MS1 acquisition at the second polarity which is negative. The process then repeats in the second polarity with the MS2 scans commencing with the ion trap after the ions for the MS1 scan have been acquired. The switching polarity of the ion trap also has a deadtime (DT3) in which the ion trap is not available for use, but advantageously this deadtime is timed to coincide with the acquisition of ions by the orbital trapping analyser for the MS1 scan, so use of the ions/ion beam is maintained.

Accordingly, FIG. 4 shows an instrument cycle in which when a first analyser (orbital trapping analyser) is either acquiring MS1 or polarity switching, the second analyser (ion trap) is running MS2 acquisition, and when the second analyser (ion trap) is switching polarity the first analyser (orbital trapping analyser) is loading ions for MS1 acquisition. The ion source may also switch polarity whilst the ion trap makes its last analysis. As can be seen from the figure the deadtimes (DT) repeat when the ion source and processing region/guides, first analyser and second analyser switch polarity for the second time, namely back to the first polarity. There is also a deadtime at the beginning of the timeline in the figure for the second analyser where it is switching to the first polarity while the orbital trapping analyser is loading ions. If the start of the timeline in FIG. 4 represents the first acquisition from the sample, then the second analyser may already be set from start-up at the correct polarity and no switching may initially be required.

Although FIG. 4 shows the method applied to an orbital trapping analyser as the first mass analyser and an ion trap as the second mass analyser, other types of analyser may be used. Furthermore, although FIG. 4 shows the orbital trapping analyser as making the first acquisitions after the ion source has switched polarity, the sequence may be reversed such that the Ion Trap makes the first acquisitions. In such a case, the orbital trapping analyser switching time might occupy the initial part of the time at the first polarity. In comparison to the method of FIG. 4, this method might be less suited to data dependent analysis (DDA) because the MS1 data would not be collected and processed before the MS2 scans and therefore could not be used to decide the m/z mass ranges for which the MS2 spectra are to be collected. However, as the cycle should repeat many times per experiment only a portion of the first cycle may be lost, and subsequent cycles would provide similar data to the method of FIG. 4.

Figure 5:
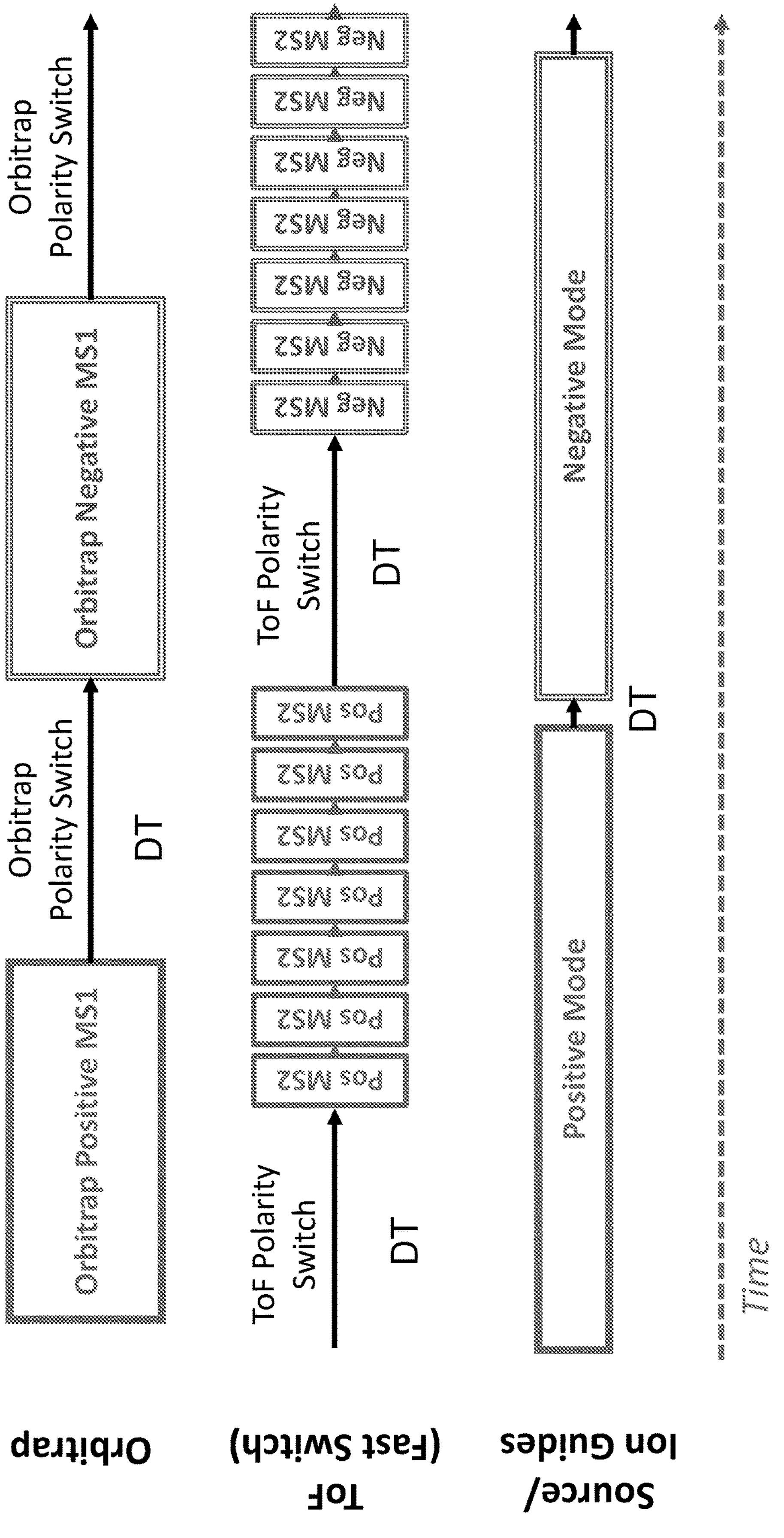
FIG. 5 shows a method of performing dual polarity tandem mass spectrometry with an orbital trapping mass analyser and time-of-flight analyser hybrid instrument according to an embodiment of the present invention.

A second embodiment, similar to the first embodiment, is shown in FIG. 5. Here the second analyser is a time-of-flight analyser (ToF) such as the MR-ToF of FIGS. 2 and 3. The timings and operations of the ion source and ions guides/processing region are substantially the same as described for FIG. 4. However, the ToF analyser may have a longer polarity switching time. Hence, as shown in FIG. 5, the increased polarity switching time of the ToF analyser as compared to the ion trap of FIG. 4 may result in the MS2 scans commencing slightly later and fewer MS2 scans being performed. Nevertheless, similarly for FIG. 4, FIG. 5 shows an instrument cycle in which when a first analyser (orbital trapping analyser) is either acquiring MS1 or polarity switching, the second analyser (ToF) is running MS2 acquisition, and when the second analyser (ToF) is switching polarity the first analyser (orbital trapping analyser) is loading ions for MS1 acquisition and optionally beginning MS1 acquisition. The source may also switch polarity whilst the ToF makes its last analysis.

Although the ToF analyser as the second analyser has a longer switching time and a reduced operational time as compared to the ion trap of FIG. 4, it remains preferable to use the orbital trapping analyser as the first analyser for performing MS1 scans, for example, if the ToF analyser is an MR-ToF, and is highly sensitive and therefore more suited to the MS2 scans. Furthermore, high mass accuracy may not be so important for ToF MS2 scans and the long electronic stabilisation times for the electronics may be slightly reduced.

Figure 6:
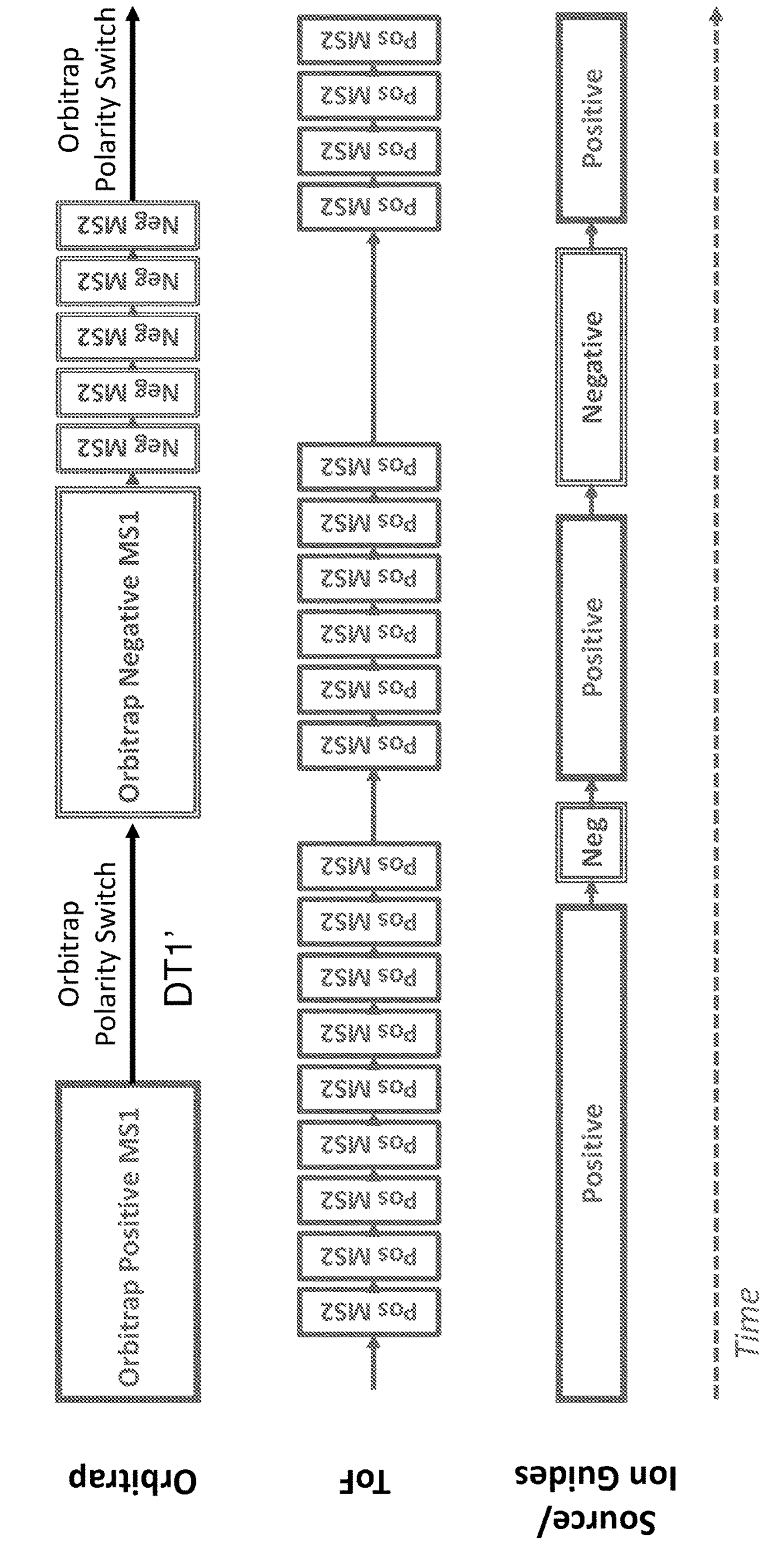
FIG. 6 shows a method of performing mixed polarity mass spectrometry with an orbital trapping mass analyser and time-of-flight analyser hybrid instrument according to an embodiment of the present invention.

FIG. 6 shows a third embodiment. This embodiment is similar to FIG. 5 in that the mass spectrometer comprises an orbital trapping analyser as the first analyser and a ToF analyser as the second analyser. Differently to FIG. 5, in FIG. 6 the polarity of the ToF analyser is fixed and it is only used for MS2 scans in one polarity. In FIG. 6 the ToF analyser is only used for the positive polarity (although alternatively this could be only the negative polarity). The orbital trapping analyser performs MS1 scans in both polarities as well as negative polarity MS2 scans. The method of FIG. 6 again uses the idea of reducing the impact of switching deadtime of one analyser by directing ions from the source to the second analyser for performing scans. We now describe the method of FIG. 6 in more detail. Different to FIGS. 4 and 5 which require the ion source and guide/processing region to be polarity switched twice to complete a full cycle of positive and negative MS1 and MS2 scans, FIG. 6 requires the polarity to be switched four times. The cycle starts similarly to that of FIG. 5 with the orbital trapping analyser collecting ions for a positive polarity MS1 scan, followed by the ToF analyser generating positive polarity MS2 scans. The time while the orbital trapping analyser is processing the ions to acquire the MS1 scan is filled by operation of the ToF collecting the MS2 scans and thereby maximising use of the ions/ion beam. After the orbital trapping analyser has completed the MS1 scan it starts switching polarity (DT1') while the ToF analyser continues collecting MS2 spectra. The next step is also similar to that of FIG. 5 in that after the ions have been collected for the last of a group of MS2 scans, the polarity of the ion source and guide/processing region is switched. When the ion source/processing region has switched polarity the orbital trapping analyser has also switched and acquisition of a negative MS1 scan by the orbital trapping analyser commences. The next step is different to FIG. 5. After the orbital trapping analyser has collected ions for generating the negative MS1 scan, the ion source and guide/processing region is switched back to the first polarity, namely the positive polarity and the ToF can collect more positive MS2 scans. Here, as soon as the ion source and guide/processing region has switched the ToF can commence MS2 acquisition because it is already at the required polarity. After the negative MS1 scan is completed the ion source and guides/processing region is switched negative to allow negative MS2 scans to be generated by the orbital trapping analyser. The orbital trapping analyser is already at negative polarity having just completed the negative MS1 scan so can commence negative MS2 acquisition as soon as the ion source and guides/processing region has switched. Also by having the negative MS1 and negative MS2 scans following one after the other, the number of times the orbital trapping analyser is switched in this method is minimized. After the ions for the final negative MS2 scan by the orbital trapping analyser have been acquired, the ion source and guides/processing region are polarity switched and acquisition of positive polarity MS2 scans can commence. While these scans are generated the orbital trapping analyser is polarity switched back to the first polarity, namely positive polarity.

The method of FIG. 6 avoids significant deadtime that may be incurred by long switching times of the ToF analyser, although additional switching is required. There is a gap in ToF operation whilst the orbital trapping analyser generates negative ion MS2 spectra, which means there is a period where positive MS2 ions are not being analysed and elution of species from the LC column could be missed. However, if the MS2 acquisition times are longer then it may be possible to rapidly switch source polarity and take additional positive MS2 ToF spectra interleaved with the negative orbital trapping analyser MS2 spectra. Furthermore, with scheme shown in FIG. 6 more results are obtained for the positive polarity side of the measurement. If equivalent results are desired for the negative polarity side, time allowances of each of the scans can be adjusted to equalise the weighting.

Figure 7:
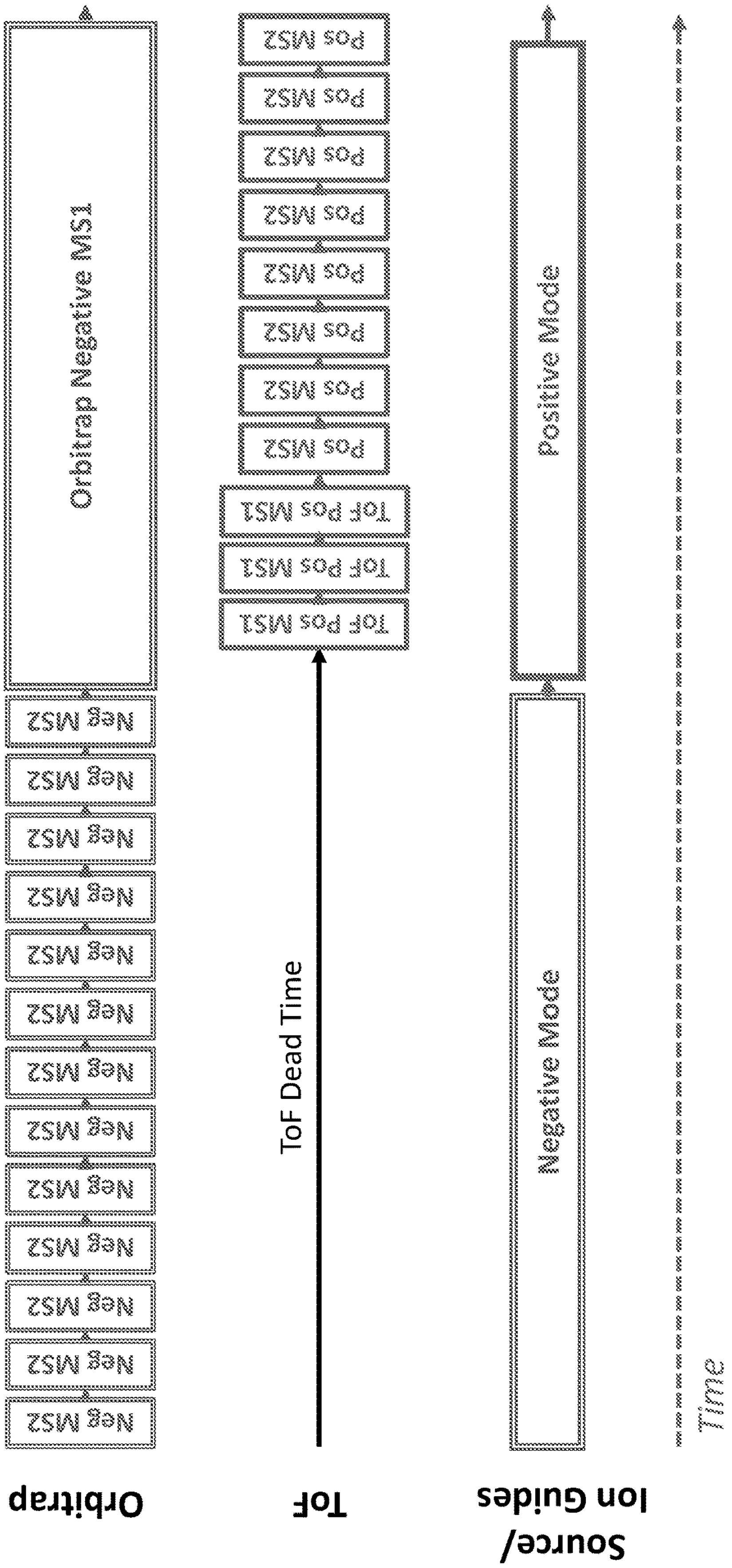
FIG. 7 shows a method of performing mixed polarity mass spectrometry with an orbital trapping mass analyser and time-of-flight analyser hybrid instrument according to an embodiment of the present invention in which the analysers are fixed to act in opposite polarities.

A fourth embodiment is shown in FIG. 7. Similar to FIGS. 5 and 6 this embodiment also uses an orbital trapping analyser as the first analyser and a ToF analyser as the second analyser. In FIG. 7 the amount of switching is reduced. This is achieved by using a ToF or MR-ToF analyser of sufficient quality for MS1 acquisition. For example, a ToF or MR-ToF analyser having at least >30K resolving power and <10 ppm mass accuracy, which a modern qToF would be able to provide, would be sufficient. That said, >50K resolving power and <5 ppm mass accuracy would be preferred. In such a case there is no need to polarity switch either of the analysers at all. It is only required to switch the ion source and guides/processing region. In the scheme shown in FIG. 7 the ion source and guides/processing region is shown as initially at negative polarity and the orbital trapping analyser is generating negative MS2 spectra. During this time the ToF analyser is not in use and experiences deadtime. After sufficient negative MS2 spectra have been collected by the orbital trapping analyser, ions are collected for the orbital trapping analyser to generate an MS1 scan. After the ions have been collected the ion source and guides/processing region are switched to a second polarity, namely positive polarity. Positive MS1 acquisition by the ToF analyser can then commence, and is then followed by positive MS2 scans by the ToF analyser. The positive MS1 and positive MS2 scans by the ToF analyser are largely simultaneously with the orbital trapping analyser generating the negative MS1 scan. After the orbital trapping analyser has completed the negative MS1 scan and the ToF analyser has completed the positive MS2 scans, the polarity of the ion source and guides/processing region is switched back to the first polarity, namely negative polarity. The skilled person would understand that a corresponding method may be performed with the first and second polarities reversed. Also the timing of the MS1 and MS2 scans may be reversed, such as for the positive scans performed by the ToF analyser. As shown in FIG. 7, when MS1 acquisition is performed by the ToF analyser, this may be done in multiple MS1 scans each directed to a mass sub range of the mass range of interest (as described above with respect to FIG. 3). Alternatively, a single MS1 scan may be performed directed to the entire mass range of interest.

Although there is no polarity switching of one analyser for another to cover (as described in relation to FIGS. 4 and 5), the scheme of FIG. 7 does use the long orbital trapping analyser MS1 acquisition time to acquire ToF MS1 and MS2 spectra. Hence, potential deadtime is again minimised by operating a hybrid analyser combination. Again, the proportion of time the ion source spends in negative or positive mode may be varied, for example if more time is required to gather orbital trapping analyser MS2 spectra than equivalent ToF spectra.

Figure 8:
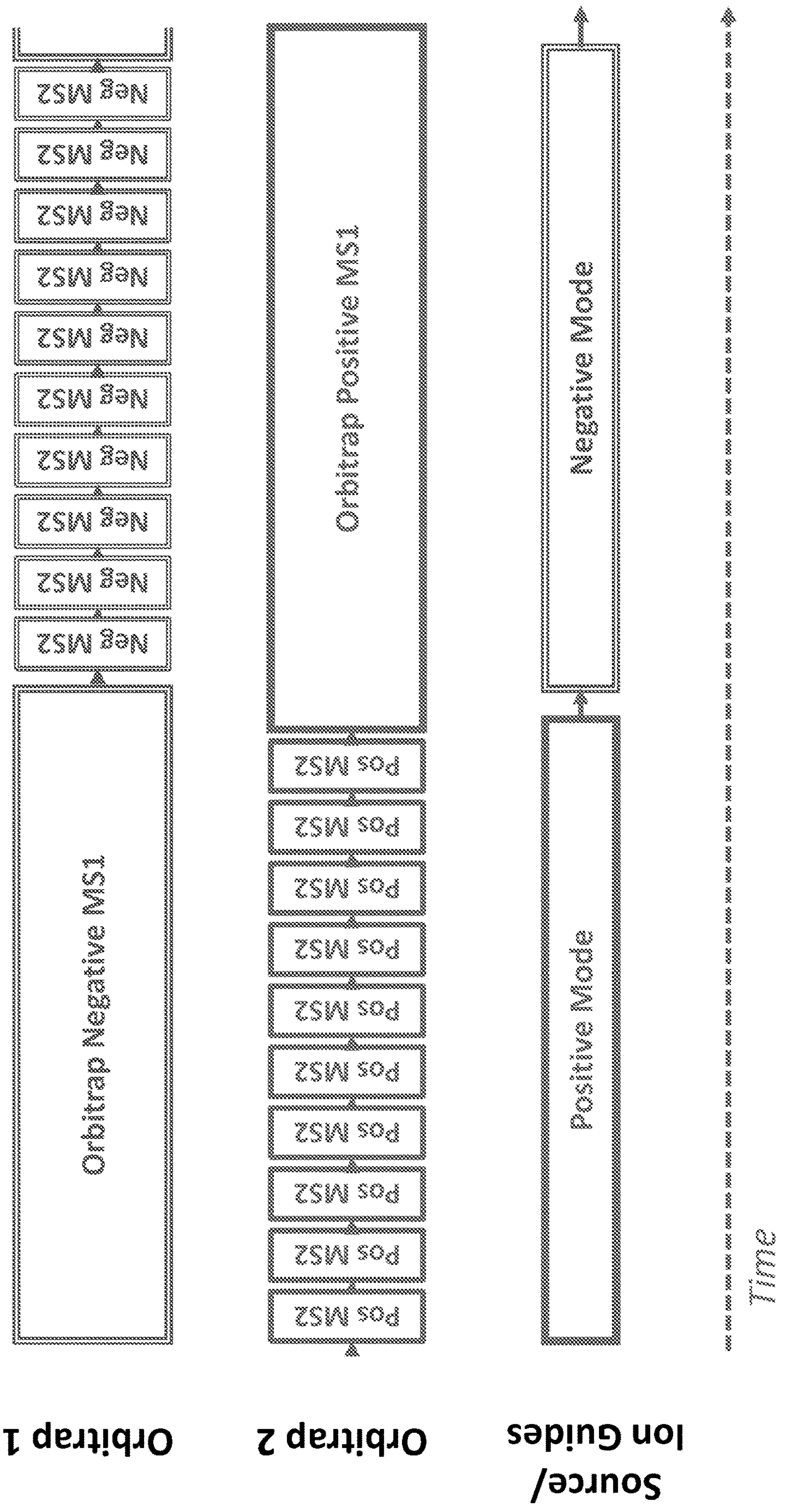
FIG. 8 shows a method of performing mixed polarity mass spectrometry with a dual orbital trapping mass analyser instrument according to an embodiment of the present invention in which the analysers are fixed to act in opposite polarities.

A fifth embodiment is shown in FIG. 8. This scheme uses a dual orbital trapping analyser instrument, that is it has an orbital trapping analyser as the first analyser and a second orbital trapping analyser as the second analyser. Here each orbital trapping analyser is dedicated to one polarity. Hence, as shown in FIG. 8 the first analyser is set for negative polarity and the second analyser is set for positive polarity. The ion source and guides/processing region cycle from one polarity to the other, directing ions to the respective analyser during each polarity.

In FIG. 8 the ion source and guides/processing region commence at positive polarity and the second orbital trapping analyser is generating positive MS2 scans. In the meantime the first orbital trapping analyser, which received ions from the source and ion processing region while at negative polarity prior to switching to positive polarity, is performing a negative MS1 scan. After the second orbital trapping analyser has completed the positive MS2 scans, the second orbital trapping analyser receives ions for commencing a positive MS1 scan. After the ions for the positive MS1 scan have been provided the source and ion processing region are switched to negative polarity and the first orbital trapping analyser generates negative MS2 scans. The negative MS2 scans are performed by the first orbital trapping analyser while the positive MS1 scan is performed by the second orbital trapping analyser.

In summary, the scheme of FIG. 8 directs ions for the acquisition of a series of MS2 spectra on one analyser (at a first polarity) whilst the other analyser processes an MS1 acquisition in parallel (at a second polarity). This scheme has minimal deadtimes due to not requiring the orbital trapping analyser to switch polarity and has equal times provided for both polarities. It may be desirable to provide more time to MS2 spectra than MS1 spectra. This could be achieved by extending times for one polarity if more MS2 scans of one of the polarities is desired, whilst the MS1 transient length in the other polarity could be extended to eliminate deadtime.

Figure 9:
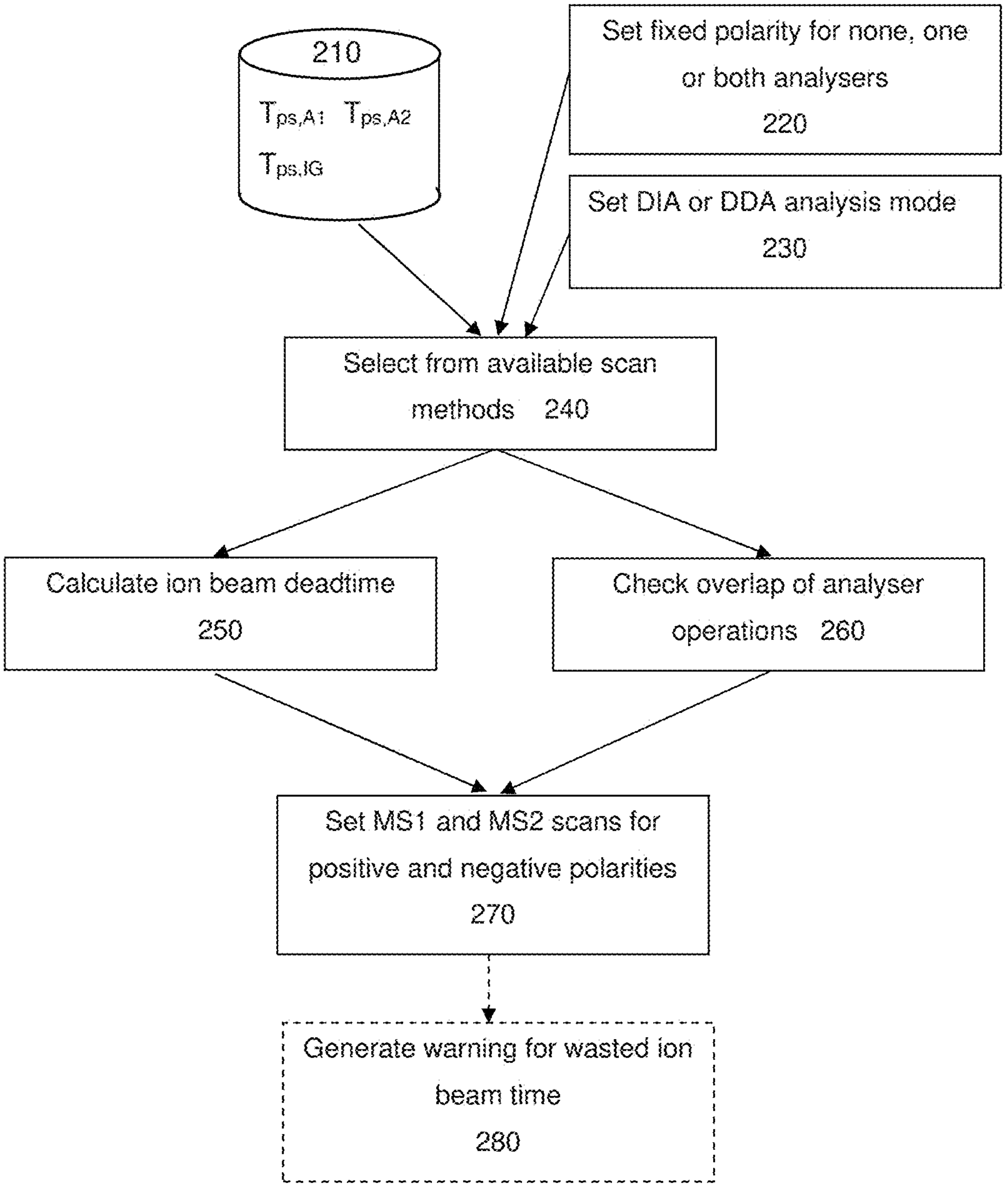
FIG. 9 is a flow-chart showing a method of controlling a dual analyser mass spectrometer for mixed polarity operations.

The present invention also provides a computer implemented method of controlling a dual analyser mass spectrometer for mixed polarity operations, as shown in FIG. 9. The method may be performed by a controller such as controller 195 of FIG. 2 or may be performed by a computer in combination with controller 195.

The method may cause the computer and/or controller to automatically scan through and select the optimised timings for performing dual polarity MS1 and MS2 scans or may provide prompts or receive inputs from user at a user interface. The computer and or controller may store the times ($T_{ps,A1}$; $T_{ps,A2}$) required to switch polarity for the first and second analysers and also the time ($T_{ps,IG}$) required to switch polarity for the ion source and guide region of the mass spectrometer. These times may be stored in a memory or database 210.

In one example, the computer/controller may split the control of the polarity of the ion guide regions for simultaneous multiple ion packet processing. Here the computer/controller selects the polarity of most components in the guide region based on the ions/packets immediately coming through them. As most of the components in the processing region individually switch polarity very fast, there is no extra downtime. The computer/controller is programmed to know the polarity each component has to be at the respective time the ions arrive at it (for example, based on ion travel times), and processes several ion packets simultaneously. For example, for simultaneous processing of positive and negative ions such as described in regard to FIGS. 4-8, the controller may control the extraction trap 140 to hold positive ions whilst the quadrupole 70 is controlled to admit negative ions.

As described above regarding FIGS. 4 to 8 there are a number of methods for optimally obtaining MS1 and MS2 scans in both polarities. The optimum method(s) for a given mass spectrometer will depend on the types of mass analysers used and their respective switching times. For some types of analysers, such as MR-ToF analysers, it may be preferable to fix the analyser to one polarity. This may be determined automatically by the computer or controller or may be set by the user, as indicated at 220. For some methods, such as those shown in FIGS. 7 and 8, it may be preferable to fix the polarity of both analysers. The user may also wish to set whether the acquisition mode is a data independent analysis (DIA) mode in which the mass spectrometer cycles through a preset list of MS1 and MS2 acquisitions in a specified order, or the user may set the acquisition mode to a data dependent analysis (DDA) mode in which an MS1 scan is used to generate a precursor list and that list is used to run through a series of MS2 scans of fragmented ions based on the precursor list. The DDA method is more focused but the DIA method may be better if little is known about the species being analysed. Preferably, the selection between DIA and DDA modes is made by a user, and is shown at 230 in FIG. 9

At step 240 the computer and/or controller selects from available methods based on the information at 210, 220 and 230. For example, depending on the types of mass analyser and the user's selection of DIA or DDA some methods may not be available. Having determined which methods are available, the computer may determine the timings and duration for performing MS1 and MS2 scans by the respective analysers/which may include at 250 calculating the amount of ion beam deadtime where the ion beam is not directed to an analyser and at 260 checking for overlap of analyser operations such that analysers are in use to the maximum extent possible. The computer and/or controller then, at step 270, sets the mass spectrometer to perform the MS1 and MS2 scans at the dual polarities based on the inputs 210, 220, 230 and the available methods. Optionally, the computer and/or controller may generate a warning at 280 if the ion beam is not used for a predetermined amount of time or a predetermined proportion of the time.

In determining the timings for the MS1 and MS2 scans the controller and/or computer may take into account the length of time to perform an MS1 scan by the respective analyser and the length of time to perform an MS2 scan by the respective analyser. For example, the controller and/or computer may determine that while a single MS1 scan is being performed by one of the analysers, the other analyser may have time to perform a number, X, of MS2 scans. The computer and/or controller may also identify when a scan or scans have being completed, such as after an MS1 scan or after a chain of MS2 scans, and a polarity switch is required such that it can take into account the polarity switching time of the respective one or both analysers switching polarity and/or the polarity switching time of the ion source and ion guide region. Preferably, the timings for performing the scans may include ion transfer times from the source and ion guide region and any ions traps, as required.

The differing methods above all rely on relatively optimised timings of different instruments according to computer control. For example, if the selected method is based on the method of FIG. 6 the control must provide sufficient numbers of ToF MS2 spectra to fill the dead spots of the orbital trapping analyser polarity switch. The computer implemented method may calculate the times required for the various operations, including scans and polarity switching. For example, for FIG. 6, an MR-ToF cycle takes ~5 ms, whilst an orbital trapping analyser MS1 scan may require 256 ms for suitable 120K resolution. As mentioned, for Data Independent Methods which generally cycle through a preset list of acquisitions in a preset order, it may be preferable for the user interface provide to the user a visualisation or calculation of the overlap of analyser operations and return warnings for wasted beam time.

For determining Data Dependent Methods in which an experimental cycle creates a precursor list from MS1 scans, and then runs that list through a series of N MS2 scans, the method should preferably specify that the time allowance for MS2 scans does not exceed the time for MS1 scans plus polarity switching. It may also be necessary to factor priorities between positive and negative MS1 and MS2. For example, the method of FIG. 6 has negative ion MS2 performed slowly by the orbital trapping analyser, so only 10 negative MS2 scans might be allowed per cycle but potentially 100 positive ToF MS2 scans per cycle.

The computer implemented method preferably automatically optimises a method. For example, when there are few negative ions the balance of instrument time might be tilted to greater positive mode operation, and vice versa. This preference for one polarity over the other may be an additional input provided by the user prior to the computer implemented method determining the preferred analysis method. An algorithmic optimisation may prove necessary for more complicated methods, for example those with special on-the-fly adjustments, multiple MS1 scan ranges, differing fragmentation methods with their own processing times, and variation of orbital trapping analyser MS1 scan length based on number (or prediction) of precursors etc. The computer implemented method may generate various analysis methods and present them to the user on the user interface, which may allow the user to select the preferred analysis method, and optionally modify the preferred method.

Figure 10:
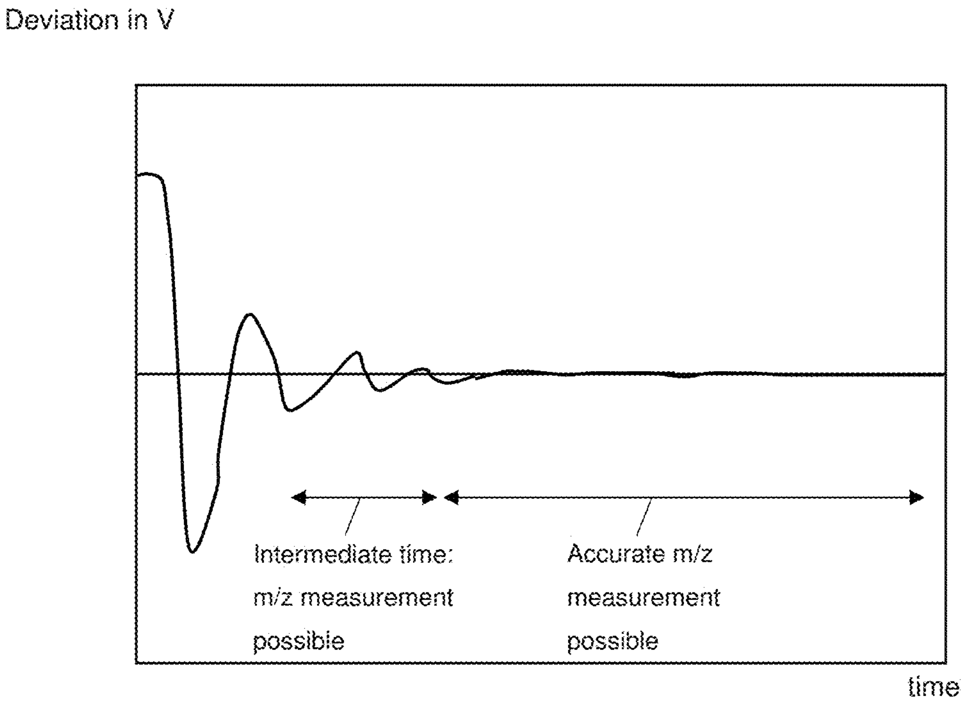
FIG. 10 is a schematic diagram of polarity switching speed for a HV electrode of an MR-ToF analyser.

We have described above how the time for polarity switching of mass analysers delays the start of mass analysers from re-commencing measurements. This is largely caused by waiting for HV regulated sources to stabilise sufficiently. FIG. 10 shows schematically the variation in voltage after a HV voltage source has switched polarity. As time progresses the deviation reduces. While immediately after switching it is not possible to measure ion m/z because of the large fluctuations in voltage, there is an intermediate time during which ion m/z may be measured and then once the fluctuations have reduced to a low level ion m/z may be measured to the required accuracy. These different measurement regimes are shown in FIG. 10. It has been determined that during the intermediate time, and to some extent immediately after switching, it is possible to measure the measured mass shift with time caused by the fluctuated HV. By measuring this fluctuation a suitable correction may be applied to ion m/z measurements to remove inaccuracies caused by the fluctuations and effectively extend the accurate m/z measurement range to times closer to the switching time. Similarly a method incorporating internal calibrant correction around a polarity switch, or only using low accuracy requirement acquisitions such as MS2 scans also allow a reduction in dead time.

Figure 11:
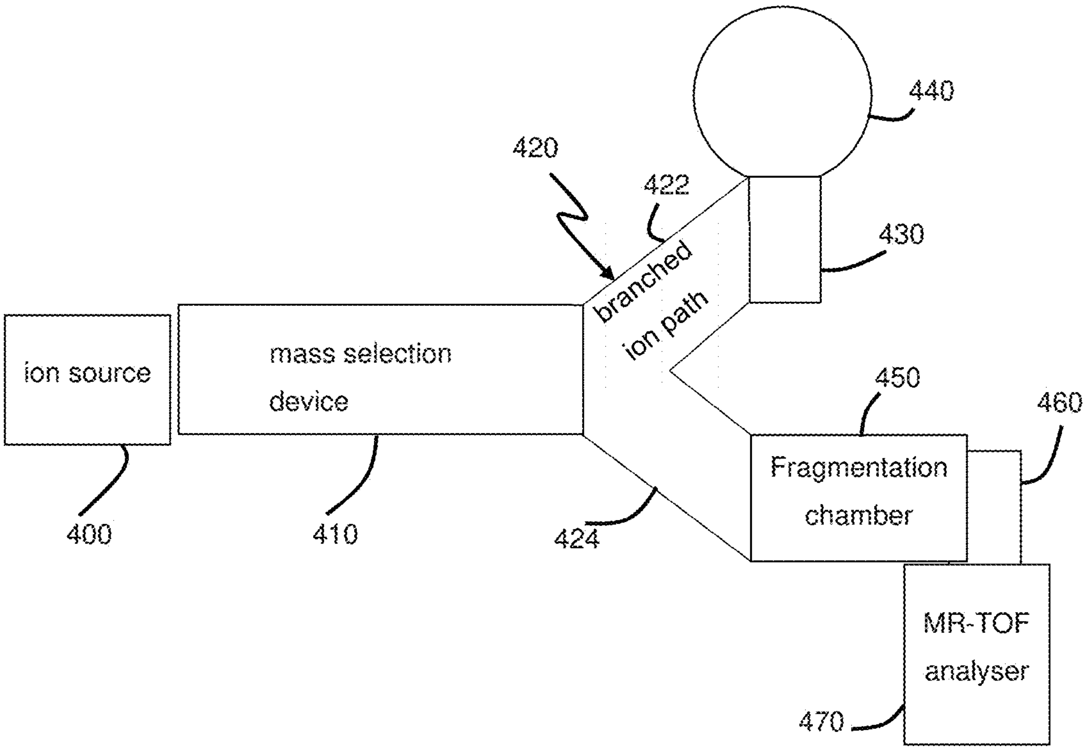
FIG. 11 shows a schematic diagram of an alternative mass spectrometer suitable for carrying out method in accordance with embodiments of the invention.

We have described above, with reference to FIG. 2, an embodiment of dual analyser mass spectrometer. In an alternative embodiment, the mass spectrometer may be provided with a branched path arrangement, for example as shown in the embodiment in FIG. 11. In the embodiment of FIG. 11, an ion source 400 is coupled to an ion processing region such as mass selection device 410. Such an arrangement may be provided by the ESI ion source 20 and its respective couplings to the quadrupole mass filter 70 as shown in the embodiment of FIG. 2 for example.

As shown in FIG. 11, the output of the mass selection device 410 is coupled to the branched ion path 420. The branched ion path directs ions output from the mass selection device along one of two paths. A first path 422 directs ions to a C-trap 430 where ions are collected for analysis by a first mass analyser, for example an orbital trapping mass analyser 440 in the MS1 domain. A second path 424 directs ions to a fragmentation chamber 450 for fragmentation of ions and subsequent mass analysis in the MS2 domain by a second mass analyser 470. The branched ion path may use an RF voltage to direct ions down either the first path 422 or the second path 424. The branched ion path may be a branched RF multipole. A branched ion path suitable for use in the embodiment of FIG. 11 is further described in U.S. Pat. No. 7,420,161.

In the embodiment of FIG. 11, the branched ion path may be used to direct ions to a C-trap 430 for MS1 analysis or to a fragmentation chamber 450 for MS2 analysis. Fragmented ions ejected from the fragmentation chamber 450 may be accumulated in ion extraction trap 460, before being injected into MR-ToF analyser 470 as a packet. As such, the arrangement of the fragmentation chamber 450, ion trap 460 and MR-ToF 470 may be provided by a similar arrangement as described in FIG. 2.

Thus, according to the embodiment of FIG. 11, ions may be directed for MS2 analysis without requiring the C-trap 430 supplying the MS1 orbital trapping mass analyser 440 to be empty. Such a configuration may allow increased parallelisation of the MS1 and MS2 scans. As such, a greater proportion of the duration of a chromatographic peak may be available for carrying out MS2 scans. Furthermore, in this configuration, a number of loadings or fills can be accumulated in the C-trap 430 before analysis in the orbital trapping mass analyser 440. In such embodiments, the loading (filling) of the C-trap 430 can be split into several small fills whilst the orbital trap mass analyser 440 is scanning, thereby to obtain a population of ions that is more representative of the ions from across the entire peak.

Figure 12:
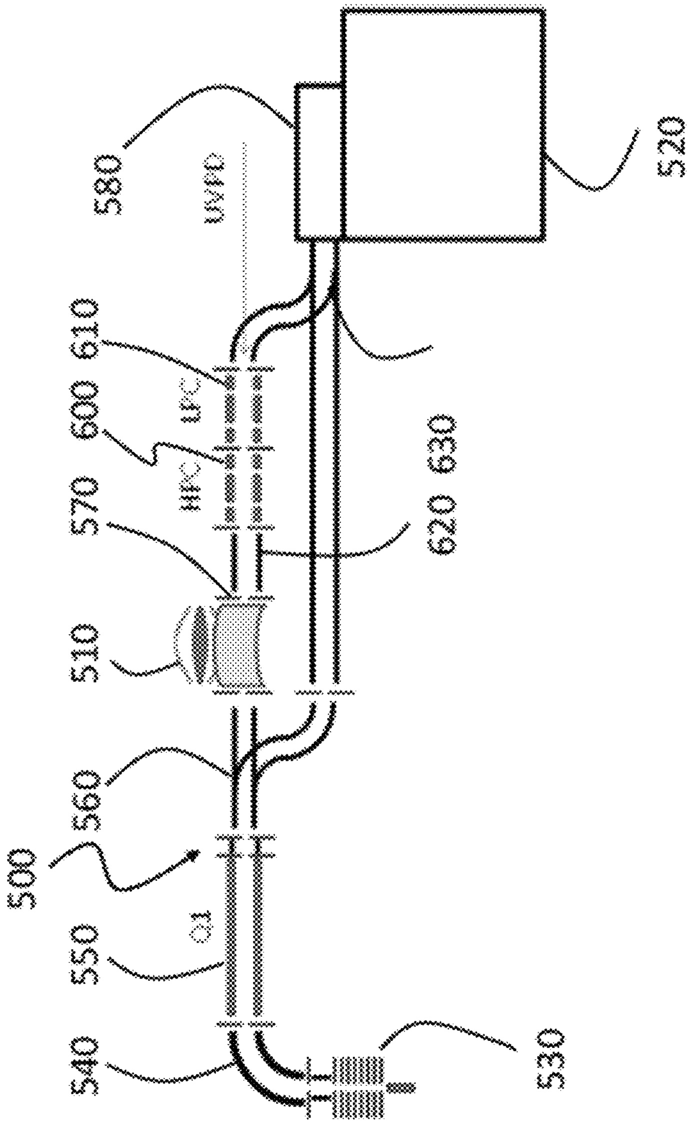
FIG. 12 shows a schematic diagram of a further alternative mass spectrometer suitable for carrying out method in accordance with embodiments of the invention.

A further alternative embodiment of an embodiment of a dual analyser mass spectrometer is shown in FIG. 12. FIG. 12 depicts a schematic diagram of a tandem mass spectrometer 500 including an orbital trapping mass analyser 510 and a time of flight mass analyser 520 in a branched path configuration.

The embodiment of FIG. 12 includes an ion source 530 and ion guide 540 which supply precursor ions to a mass selector 550. Such an arrangement may be provided by the ESI ion source 20 and its respective couplings to the quadrupole mass filter 70 as shown in the embodiment of FIG. 2 for example.

As shown in FIG. 12, a branched ion path 560 guides ions from the mass selector 550 to a C-trap 570 and/or an extraction trap 580. The C-trap 570 supplies ions to the orbital trapping mass analyser 510 for MS1 scans, while the extraction trap 580 supplies ions to the time of flight mass analyser 520. For example, a similar arrangement to the embodiment disclosed in FIG. 11 may be provided.

FIG. 12 additionally includes a dual linear trap 600, 610. The dual linear trap is connected downstream of the C-trap 570 between the C-trap 570 and the extraction trap 580 for the time of flight mass analyser. The dual linear trap may be connected to the C-trap 570 and the extraction trap 580 by ion guides 620, 630. Ion guide 630 may be a branched ion path which merges with the ion path from the mass selector 550 in order to connect to the extraction trap 580.

The dual linear trap 600, 610 may be provided for fragmentation and/or mass isolation of the ions. For example, a first ion trap 600 may be provided as a high energy collision dissociation chamber. A second ion trap 610, downstream of the first ion trap may be provided as a low collision dissociation chamber. By including a second dissociation chamber, fragmented ions may readily be fragmented again in the second chamber in order to perform MS3 analysis. Ions may be repeatedly isolated and fragmented for $MS^n$ analysis. The dual linear trap may also allow for fragmentation by collision induced dissociation (CID), electron capture dissociation (ECD), electron transfer dissociation (ETD), ultraviolent photo dissociation (UVPD), and so forth. Further details of a suitable dual ion trap may be found in U.S. Pat. No. 8,198,580, the contents of which is herein incorporated by reference in its entirety.

Advantageously, by providing a branched path directly to the extraction trap 580 from the mass selector 550, ions may be more efficiently transferred from the mass selector 550 to the extraction trap.

The person skilled in the art will readily appreciate that various modifications and alterations may be made to the above described methods and apparatus. The modifications may be made without departing from the scope of the appended claims. For example, the order of MS1 and MS1 scans and whether negative or positive polarity may be changed. Steps of methods from different embodiments may be combined. Alternative dual analyser mass spectrometers and alternative mass analysers may be used.

The invention claimed is:

1. A method of operating a dual analyser mass spectrometer to obtain MS1 and MS2 scans of positive and negative ions from a sample, the method comprising:

ionising the sample, in an ion source and ion processing region of the mass spectrometer, the ion source and processing region operating at a first polarity, to produce a plurality of ions;

directing a first packet of ions of the plurality of ions to a first mass analyser and performing, by the first mass analyser at the first polarity, a first scan sequence comprising at least one MS1 scan or at least one MS2 scan of the ions in the first packet, and after performing the at least one MS1 scan or the at least one MS2 scan switching polarity of the first mass analyser to a second polarity; and directing one or more second packets of ions of the plurality of ions to a second mass analyser and performing, by the second mass analyser at the first polarity, a second scan sequence comprising at least one MS1 scan or at least one MS2 scan of the ions in the one or more second packets, wherein at least part of the at least one MS1 scan or at least part of the at least one MS2 scan performed by the second mass analyser is performed during a first deadtime in which the first mass analyser is switching polarity.

2. The method of claim 1, further comprising:

while the second mass analyser performs, at the first polarity, at least one MS1 scan or at least one MS2 scan of the ions in the one or more second packets, switching polarity of the source and ion processing region of the mass spectrometer to a second polarity.

3. The method of claim 2, wherein a last MS1 or MS2 scan of the second scan sequence, performed by the second mass analyser at the first polarity, is at least partly performed during a second deadtime in which the source and ion processing region is switching polarity to the second polarity.

4. The method of claim 2, further comprising:

after switching polarity of the source and ion processing region, ionising the sample in the ion source and ion processing region operating at the second polarity to produce a further plurality of ions; and directing a third packet of ions to the first mass analyser and performing, by the first mass analyser operating at the second polarity, a third scan sequence comprising at least one MS1 scan or at least one MS2 scan of the ions in the third packet.

5. The method of claim 4, further comprising:

after performing, at the first polarity by the second mass analyser, the at least one MS1 scan or the at least one MS2 scan of the ions in the one or more second packets, the at least part of at the least one MS1 scan or at least part of the at least one MS2 scan performed during a first deadtime in which the first mass analyser is switching polarity, switching the polarity of the second mass analyser to the second polarity; and directing one or more fourth packets of ions to the second mass analyser and performing, by the second mass analyser at the second polarity, a fourth scan sequence comprising at least one MS1 scan or at least one MS2 scan of the ions in the one or more fourth packets.

6. The method of claim 5, wherein performing, by the first mass analyser operating at the second polarity, the at least one MS1 scan or the at least one MS2 scan of the ions in the third packet, is at least partly performed during a third deadtime in which the second mass analyser is switching polarity to the second polarity.

7. The method of claim 6, wherein performing, by the first mass analyser operating at the first polarity, the at least one MS1 scan or the at least one MS2 scan of the ions in the first packet, is at least partly performed during a fourth deadtime in which the second mass analyser is switching polarity to the first polarity.

8. The method of claim 4, wherein the third scan sequence, performed by the first mass analyser at the second polarity is an MS1 scan, the method further comprising:

after directing the third packet of ions to the first mass analyser and initiating the third scan sequence, without switching polarity of the second mass analyser, directing one or more fourth packets of ions to the second mass analyser and performing, at the first polarity by the second mass analyser, one or more MS2 scans of the ions in the one or more fourth packets, at least part of the one or more MS2 scans performed while the first mass analyser is performing the MS1 scan.

9. The method of claim 8, further comprising:

after performing, at second polarity by the first mass analyser, the MS1 scan during the third scan sequence, switching the polarity of the source and ion processing region to the second polarity, and after the switching of the polarity of the source and ion processing region to the second polarity, directing one or more fifth packets of ions to the first mass analyser and performing, by the first mass analyser at the second polarity, a fifth scan sequence comprising one or more MS2 scans of the ions in the one or more fifth packets.

10. The method of claim 8, wherein the second mass analyser is not switched polarity and only performs MS2 scans at the first polarity.

11. The method of claim 10, the method being performed within a time period based on a width of a chromatographic peak of the sample as it elutes from a chromatography system.

12. The method of claim 10, wherein the first scan sequence comprises one or more MS1 scans and the second scan sequence comprises one or more MS2 scans.

13. The method of claim 10, wherein when MS2 scans are performed in a scan sequence, the scan sequence comprises performing a plurality of MS2 scans respectively on a series of packets of ions sequentially directed to the respective analyser.

14. The method of claim 10, wherein the first mass analyser is an orbital trapping mass analyser and the second mass analyser is an ion trap mass analyser or a time-of-flight mass analyser (e.g. MR-ToF).

15. The method of claim 10, wherein the dual analyser mass spectrometer comprises one or more ion traps such as curved linear ion traps or C-traps, the method comprising, at least one of the one or more ion traps, aggregating ions ionised by the source and ion processing region to form packets of ions, and, by the at least one ion trap, directing packets of ions to the first mass analyser and/or to the second mass analyser.

16. The method of claim 10, wherein the first mass analyser and/or second mass analyser takes a time period of at least 50 ms, at least 100 ms, at least 200 ms or at least 500 ms, to switch polarity and recommence mass analysis.

17. The method of claim 10, wherein the mass analysers are high resolution accurate mass (HRAM) analysers.

18. The method of claim 10, further comprising:

further ionising the sample, at the first polarity, to produce a further plurality of ions;

directing a further first packet of ions of the plurality of ions to the first mass analyser and performing, by the first mass analyser at the first polarity, a fifth scan sequence comprising at least one MS1 scan or at least one MS2 scan of the ions in the further first packet, and after performing the at least one MS1 scan or the at least one MS2 scan switching polarity of the first mass analyser to the second polarity; and directing one or more further second packets of ions of the plurality of ions to the second mass analyser and performing, by the second mass analyser at the first polarity, a sixth scan sequence comprising at least one MS1 scan or at least one MS2 scan of the ions in the one or more further second packets, wherein at least part of the at least one MS1 scan or at least part of the at least one MS2 scan performed by the second mass analyser is performed during a further first deadtime in which the first mass analyser is switching polarity.

19. A mass spectrometer, comprising:

an ion source and processing region, comprising:

an ionisation source for producing a plurality of precursor ions from molecules of a sample;

a mass filter;

an ion trap configured to aggregate or collect ions ionised by the source and ion processing region to form packets of ions and selectively direct packets of ions to a first mass analyser and/or to a second mass analyser;

the first mass analyser;

a fragmentation apparatus;

the second mass analyser; and a controller configured to cause the mass spectrometer to perform the method of claim 1.

20. A computer-readable medium comprising computer program instructions, when run on a computer or controller configured to control a mass spectrometer cause the mass spectrometer to execute the steps of the method of claim 1.

21. A method of operating a dual analyser mass spectrometer to obtain MS1 and MS2 scans of positive and negative ions from a sample, a first mass analyser operating at a first polarity and a second mass analyser operating at a second polarity opposite to the first polarity, the method comprising:

ionising the sample, in an ion source and ion processing region of the mass spectrometer, the ion source and ion processing region operating at a first polarity, to produce a plurality of ions;

directing one or more first packets of ions to the first mass analyser and initiating the performing, by the first mass analyser at the first polarity, of at least one MS1 scan and/or at least one MS2 scan of the ions in the one or more first packets;

after initiating the at least one MS1 scan and/or at least one MS2 scan of the one or more first packets of ions by the first mass analyser switching the polarity of the source and ion processing region to a second polarity opposite to the first polarity; and after switching polarity of the source and ion processing region to the second polarity, directing one or more second packets of ions to the second mass analyser and performing, by the second mass analyser at the second polarity, at least one MS1 scan and/or at least one MS2 scan of the ions in the second packet;

wherein at least part of the at least one MS1 scan and/or at least part of the at least one MS2 scan performed by the first mass analyser is performed during a deadtime in which the polarity of the source and ion processing region is switched to the second polarity.

22. The method of claim 21, wherein the first mass analyser performs MS1 and MS2 scans at the first polarity and the second mass analyser performs MS1 and MS2 scans at the second polarity.

23. The method of claim 21, wherein for the first mass analyser and/or second mass analyser, a time period forming an MS1 scan is greater than a time period for performing an MS2 scan.

24. The method of claim 21, wherein the one or more first packets of ions comprises a first packet of ions, and the first mass analyser performs, at the first polarity, an MS1 scan of the ions in the first packet of ions, and after switching polarity of the ion source and ion processing region to the second polarity and directing one or more second packets of ions to the second analyser, the second analyser performs at the second polarity one or more MS2 scans on the one or more second packets of ions.

25. The method of claim 21, the method being performed within a time period based on a width of a chromatographic peak of the sample as it elutes from a chromatography system.

26. The method of claim 21, wherein the first mass analyser is an orbital trapping mass analyser and the second mass analyser is a time of flight mass analyser (e.g. MR-ToF) or an orbital trapping mass analyser.

27. The method of claim 21, wherein the dual analyser mass spectrometer comprises one or more ion traps such as curved linear ion traps or C-traps, the method comprising, at least one of the one or more ion traps, aggregating ions ionised by the source and ion processing region to form packets of ions, and, by the at least one ion trap, directing packets of ions to the first mass analyser and/or to the second mass analyser.

28. The method of claim 21, wherein the first mass analyser and/or second mass analyser takes a time period of at least 50 ms, at least 100 ms, at least 200 ms or at least 500 ms, to switch polarity and recommence mass analysis.

29. The method of claim 21, wherein the mass analysers are high resolution accurate mass (HRAM) analysers.

30. A method of operating a dual analyser mass spectrometer to obtain MS1 and MS2 scans of positive and negative ions from a sample, a first mass analyser operating at a first polarity and a second mass analyser operating at a second polarity opposite to the first polarity, the method comprising:

ionising the sample, in an ion source and ion processing region of the mass spectrometer, the ion source and ion processing region operating at a first polarity, to produce a plurality of ions;

directing one or more first packets of ions to the first mass analyser and initiating the performing, by the first mass analyser at the first polarity, of at least one MS1 scan and/or at least one MS2 scan of the ions in the one or more first packets;

after initiating the at least one MS1 scan and/or at least one MS2 scan of the one or more first packets of ions by the first mass analyser switching the polarity of the source and ion processing region to a second polarity opposite to the first polarity; and after switching polarity of the source and ion processing region to the second polarity, directing one or more second packets of ions to the second mass analyser and performing, by the second mass analyser at the second polarity, at least one MS1 scan and/or at least one MS2 scan of the ions in the second packet, wherein the one or more second packets of ions comprises a plurality of second packets of ions, and while the first mass analyser is performing the MS1 scan, and after the ion source and ion processing region have switched polarity to the second polarity, the method comprises performing by the second mass analyser one or more MS1 scans and one or more MS2 scans at the second polarity on the plurality of second packets of ions, and while the second mass analyser is performing a last of the scans on the plurality of second packets of ions, switching the polarity of the ion source and ion processing region back to the first polarity, and after switching the ion source and ion processing region back to the first polarity directing one or more third packet of ions to the first mass analyser to perform one or more MS2 scans.

31. The method of claim 30, wherein the second mass analyser performs MS1 and MS2 scans at the second polarity while the first mass analyser performs the MS1 scan at the first polarity.

32. A method of operating a dual analyser mass spectrometer to obtain MS1 and MS2 scans of positive and negative ions from a sample, a first mass analyser operating at a first polarity and a second mass analyser operating at a second polarity opposite to the first polarity, the method comprising:

ionising the sample, in an ion source and ion processing region of the mass spectrometer, the ion source and ion processing region operating at a first polarity, to produce a plurality of ions;

directing one or more first packets of ions to the first mass analyser and initiating the performing, by the first mass analyser at the first polarity, of at least one MS1 scan and/or at least one MS2 scan of the ions in the one or more first packets;

after initiating the at least one MS1 scan and/or at least one MS2 scan of the one or more first packets of ions by the first mass analyser switching the polarity of the source and ion processing region to a second polarity opposite to the first polarity; and after switching polarity of the source and ion processing region to the second polarity, directing one or more second packets of ions to the second mass analyser and performing, by the second mass analyser at the second polarity, at least one MS1 scan and/or at least one MS2 scan of the ions in the second packet;

wherein the one or more first packets of ions comprises a first packet of ions, and the first mass analyser performs, at the first polarity, an MS1 scan of the ions in the first packet of ions; and after switching polarity of the ion source and ion processing region to the second polarity and directing one or more second packets of ions to the second analyser, the second analyser performs at the second polarity one or more MS2 scans on the one or more second packets of ions;

and further comprising:

after performing one or more MS2 scans by the second analyser on the second packets of ions, directing a third packet of ions to the second analyser and performing by the second analyser at the second polarity an MS1 scan of the third packet of ions;

after directing the third packet of ions to the second mass analyser to perform an MS1 scan and while the second mass analyser performs the MS1 scan of the third packet of ions, switching the polarity of the ion source and ion processing region to a second polarity opposite to the first polarity; and after switching polarity of the ion source and ion processing region to the second polarity, directing one or more fourth packets of ions to the first mass analyser and performing, by the first mass analyser at the first polarity, one or more MS2 scans of the ions in the one or more fourth packets.

33. A method of operating a dual analyser mass spectrometer to obtain MS1 and MS2 scans of positive and negative ions from a sample, a first mass analyser operating at a first polarity and a second mass analyser operating at a second polarity opposite to the first polarity, the method comprising:

ionising the sample, in an ion source and ion processing region of the mass spectrometer, the ion source and ion processing region operating at a first polarity, to produce a plurality of ions;

directing one or more first packets of ions to the first mass analyser and initiating the performing, by the first mass analyser at the first polarity, of at least one MS1 scan and/or at least one MS2 scan of the ions in the one or more first packets;

after initiating the at least one MS1 scan and/or at least one MS2 scan of the one or more first packets of ions by the first mass analyser switching the polarity of the source and ion processing region to a second polarity opposite to the first polarity; and after switching polarity of the source and ion processing region to the second polarity, directing one or more second packets of ions to the second mass analyser and performing, by the second mass analyser at the second polarity, at least one MS1 scan and/or at least one MS2 scan of the ions in the second packet;

wherein MS2 scans on one of the first and second mass analysers are performed in parallel with an MS1 scan performed on the other of the first and second mass analysers.

* * * * *